United States Patent
Sekiguchi

(10) Patent No.: US 9,458,813 B2
(45) Date of Patent: Oct. 4, 2016

(54) VEHICLE ELECTRIC POWER SUPPLY APPARATUS

(71) Applicant: HONDA MOTOR CO., LTD., Tokyo (JP)

(72) Inventor: Satoshi Sekiguchi, Shimotsuke (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/315,432

(22) Filed: Jun. 26, 2014

(65) Prior Publication Data

US 2015/0001857 A1    Jan. 1, 2015

(30) Foreign Application Priority Data

Jul. 1, 2013  (JP) .................................. 2013-138228
Jul. 1, 2013  (JP) .................................. 2013-138229

(51) Int. Cl.
*F02N 11/08* (2006.01)
*B60R 16/03* (2006.01)
(Continued)

(52) U.S. Cl.
CPC .............. *F02N 11/0866* (2013.01); *B60L 7/10* (2013.01); *B60L 11/1868* (2013.01); *B60R 16/03* (2013.01); *F02N 11/087* (2013.01); *F02N 11/0844* (2013.01); *F02N 11/0848* (2013.01); *F02N 11/108* (2013.01); *F02N 11/04* (2013.01); *F02N 11/0814* (2013.01); *F02N 11/0825* (2013.01); *F02N 2011/0874* (2013.01); *F02N 2011/0885* (2013.01); *F02N 2011/0888* (2013.01);
(Continued)

(58) Field of Classification Search
CPC ...... B60L 7/10; B60L 11/1868; F02N 11/00; F02N 11/0866; F02N 11/0848; F02N 11/087; F02N 11/108; F02N 11/0844; F02N 11/0814; F02N 11/0825; B60R 16/03
See application file for complete search history.

(56) References Cited

U.S. PATENT DOCUMENTS 6,504,259 B1 *   1/2003  Kuroda ................... B60K 6/46
                                            180/65.25
2002/0185098 A1 * 12/2002  Perry et al. ................ 123/179.3
(Continued)

FOREIGN PATENT DOCUMENTS

EP    2532868    12/2012
FR    2875557    3/2006
(Continued)

OTHER PUBLICATIONS

Japanese Office Action dated May 19, 2015, with English translation, 6 pages.

(Continued)

*Primary Examiner* — Tulsidas C Patel
*Assistant Examiner* — Viet Nguyen
(74) *Attorney, Agent, or Firm* — Rankin, Hill & Clark LLP

(57) ABSTRACT

A control unit of a vehicle electric power supply apparatus controls an opening and closing unit to set a switch to an OFF state and a voltage detection unit to detect an output voltage of a first power source and an output voltage of a second power source when a second electric load is to be driven, and the control unit inhibits driving of the second electric load when the absolute value of the difference between the output voltage of the first power source and the output voltage of the second power source detected by the voltage detection unit is a predetermined first threshold value or less over a predetermined length of time.

1 Claim, 17 Drawing Sheets

(51) Int. Cl.
  *B60L 7/10*   (2006.01)
  *B60L 11/18*  (2006.01)
  *F02N 11/10*  (2006.01)
  *F02N 11/04*  (2006.01)

(52) U.S. Cl.
  CPC .... *F02N2200/022* (2013.01); *F02N 2200/063* (2013.01); *Y02T 10/48* (2013.01)

(56) References Cited

U.S. PATENT DOCUMENTS

| | | | |
|---|---|---|---|
| 2003/0141854 A1* | 7/2003 | Kuribayashi et al. | 322/28 |
| 2004/0140139 A1* | 7/2004 | Malik | 180/65.2 |
| 2004/0216717 A1* | 11/2004 | Shibano et al. | 123/333 |
| 2005/0197235 A1* | 9/2005 | Boe et al. | 477/107 |
| 2006/0097577 A1 | 5/2006 | Kato et al. | |
| 2007/0084430 A1* | 4/2007 | Hatayama et al. | 123/179.14 |
| 2007/0141999 A1 | 6/2007 | Przywecki | |
| 2007/0170775 A1* | 7/2007 | Uchimura et al. | 303/112 |
| 2008/0172170 A1 | 7/2008 | Lecole et al. | |
| 2008/0210187 A1* | 9/2008 | Sugano et al. | 123/179.3 |
| 2009/0096285 A1 | 4/2009 | Acena et al. | |
| 2009/0322101 A1* | 12/2009 | Reynolds | F02N 11/0866 290/38 R |
| 2012/0080001 A1* | 4/2012 | Saito et al. | 123/179.4 |
| 2013/0106180 A1* | 5/2013 | Akimasa | F02N 11/0814 307/9.1 |
| 2013/0119759 A1 | 5/2013 | Kamioka et al. | |
| 2013/0180490 A1* | 7/2013 | Odahara et al. | 123/179.4 |
| 2013/0229049 A1 | 9/2013 | Larsson et al. | |
| 2013/0233268 A1* | 9/2013 | Yamaguchi et al. | 123/179.3 |
| 2015/0008731 A1* | 1/2015 | Takahashi et al. | 307/9.1 |

FOREIGN PATENT DOCUMENTS

| | | |
|---|---|---|
| JP | 2004-328988 | 11/2004 |
| JP | 2006-029142 | 2/2006 |
| JP | 2006-191795 | 7/2006 |
| JP | 2010-081762 | 4/2010 |
| JP | 2010-195336 | 9/2010 |
| JP | 2011-004556 | 1/2011 |
| JP | 2013-072689 | 4/2013 |
| JP | 2013-091477 | 5/2013 |
| JP | 2013-106362 | 5/2013 |
| WO | 2012/008124 | 1/2012 |
| WO | 2012/111396 | 8/2012 |

OTHER PUBLICATIONS

European Search Report dated Jul. 28, 2015, 6 pages.
European Search Report, Application No. EP 141743062, dated Dec. 1, 2015, 16 pages.
Japanese Notice of Allowance with English Translation, Application No. 2013-138228, dated Dec. 1, 2015, 6 pages.
Japanese Notice of Allowance with English Translation, Application No. 2013-138229, dated Dec. 8, 2015, 6 pages.
Chinese Office Action dated Dec. 3, 2015 with partial English translation, 11 pages.

* cited by examiner

VEHICLE ELECTRIC POWER SUPPLY APPARATUS

Priority is claimed on Japanese Patent Application No. 2013-138228, filed on Jul. 1, 2013 and Japanese Patent Application No. 2013-138229, filed on Jul. 1, 2013, the contents of which are incorporated herein by reference.

BACKGROUND

1. Field of the Invention

The present invention relates to a vehicle electric power supply apparatus.

2. Background

In the related art, a vehicle electric power supply apparatus which includes a DC-DC converter connecting a main power source connected to an electric load and an auxiliary power source connected to a generator that starts an engine and includes a switch between the main power source and the auxiliary power source is known (for example, refer to Japanese Unexamined Patent Application Publication No. 2010-195336).

SUMMARY

In the vehicle electric power supply apparatus according to the above related art, it is desired to detect the presence or absence of an ON failure in which the switch is fixed to an ON state and thereby to prevent unintentional charge and discharge between the main power source and the auxiliary power source from occurring.

In addition, in the vehicle electric power supply apparatus according to the above related art, in the case that an output voltage of the auxiliary power source is decreased to less than a predetermined value and it is impossible to secure a voltage required to start the engine by the generator, the switch is closed and electric power is supplied to the generator directly from the main power source. However, only based on determining whether or not the output voltage of the auxiliary power source detected by a voltage sensor is less than the predetermined value, it is impossible to appropriately determine whether or not the generator is actually capable of starting the engine, and there is a possibility that electric power is unnecessarily supplied to the generator directly from the main power source.

In view of the foregoing, an object of an aspect of the present invention is to provide a vehicle electric power supply apparatus capable of detecting the presence or absence of an abnormality of a switch between a first power source and a second power source and preventing unintentional charge and discharge from occurring.

In addition, another object is to provide a vehicle electric power supply apparatus capable of appropriately starting an internal combustion engine.

In order to achieve the above object, a vehicle electric power supply apparatus according to an aspect of the present invention adopts one of the configurations described below.

(1) A vehicle electric power supply apparatus according to an aspect of the present invention includes: a first power source; a second power source that is connected in parallel to the first power source; a DC-DC converter that is connected between the first power source and the second power source; a switch that is connected in parallel to the DC-DC converter and is connected between the first power source and the second power source; an opening and closing unit that is used to open and close the switch; a voltage detection unit used to detect an output voltage of the first power source and an output voltage of the second power source; a first electric load that is connected to the first power source; a second electric load that is connected to the second power source and needs to be supplied with a current which is greater than that of the first electric load; and a control unit that controls the DC-DC converter, the opening and closing unit, and the second electric load, wherein the control unit controls the opening and closing unit to set the switch to an OFF state and the voltage detection unit to detect an output voltage of the first power source and an output voltage of the second power source when the second electric load is to be driven, and the control unit inhibits driving of the second electric load when the absolute value of the difference between the output voltage of the first power source and the output voltage of the second power source detected by the voltage detection unit is a predetermined first threshold value or less over a predetermined length of time.

(2) In the aspect of (1) described above, the vehicle electric power supply apparatus may be mounted in a vehicle provided with an internal combustion engine, and the second electric load may be an electric motor that is used to start the internal combustion engine.

(3) In the aspect of (1) or (2) described above, the vehicle electric power supply apparatus may be mounted in a vehicle, the vehicle being provided with an internal combustion engine and an idle stopping unit that is used to execute idle stopping in which the internal combustion engine is temporarily stopped, and the idle stopping unit may inhibit execution of the idle stopping when the absolute value of the difference between the output voltage of the first power source and the output voltage of the second power source detected by the voltage detection unit is the predetermined first threshold value or less over the predetermined length of time.

(4) In the aspect of any one of (1) to (3) described above, the vehicle electric power supply apparatus may be mounted in a vehicle, and the control unit may remove driving inhibition of the second electric load during stopping of the vehicle.

(5) Another aspect of the present invention is a vehicle electric power supply apparatus mounted in a vehicle provided with an internal combustion engine, the apparatus includes: a first power source; a second power source that is connected in parallel to the first power source; a DC-DC converter that is connected between the first power source and the second power source; a switch that is connected in parallel to the DC-DC converter and is connected between the first power source and the second power source; an opening and closing unit that is used to open and close the switch; a control unit that controls the DC-DC converter and the opening and closing unit; an electric motor that is connected to the second power source and is used to start the internal combustion engine; and a rotation frequency detection unit that is used to detect a rotation frequency of the internal combustion engine, wherein the control unit controls the opening and closing unit to set the switch to an ON state when the rotation frequency detected by the rotation frequency detection unit after a predetermined length of time elapses in the starting of the internal combustion engine by the electric motor is a predetermined second threshold value or less.

(6) In the aspect of (5) described above, the vehicle electric power supply apparatus may be mounted in the vehicle provided with an idle stopping unit that is used to execute idle stopping in which the internal combustion engine is temporarily stopped, and the idle stopping unit may inhibit next execution of the idle stopping when the rotation frequency detected by the rotation frequency detection unit after the predetermined length of time elapses in the starting of the internal combustion engine by the electric motor is the predetermined second threshold value or less.

According to the aspect of (1) described above, the control unit determines that an ON failure in which the switch is fixed to an ON state (hereafter simply referred to as "ON") occurs in the case that the absolute value of the difference between the output voltage of the first power source and the output voltage of the second power source is the predetermined first threshold value or less over the predetermined length of time. In this case, by inhibiting the driving of the second electric load connected to the second power source, it is possible to prevent the output voltage of the first power source from decreasing and to prevent the shortage of electric power supplied to the first electric load.

Moreover, according to the aspect of (2) described above, by inhibiting the occurrence of a state that requires starting of the internal combustion engine by the electric motor (for example, an idle stopping state or the like), it is possible to prevent the output voltage of the first power source from decreasing and to prevent the shortage of electric power supplied to the first electric load.

Moreover, according to the aspect of (3) described above, by inhibiting execution of the idle stopping in a state where restarting of the internal combustion engine from the idle stopping is not allowed (i.e., a state having a possibility that the output voltage of the first power source decreases due to the ON failure of the switch), the vehicle can be maintained to be operable.

Moreover, according to the aspect of (4) described above, in the case that the vehicle is stopped by setting an ignition switch to an OFF state (hereinafter simply referred to as "OFF") or the like, by removing driving inhibition of the second electric load, it is possible to enable next-time start-up of the vehicle.

In addition, according to the aspect of (5) described above, the control unit determines that electric power supplied from the second power source to the electric motor is actually insufficient in the case that the rotation frequency after the predetermined length of time elapses in the starting of the internal combustion engine by the electric motor is the predetermined second threshold value or less. In this case, by setting the switch to ON, it becomes possible to supply electric power from the first power source to the electric motor, and it is possible to appropriately start the internal combustion engine.

Moreover, according to the aspect of (6) described above, by inhibiting execution of the idle stopping in a state where restarting of the internal combustion engine from the idle stopping is not allowed (i.e., a state where it is determined that there is a need to set the switch to ON in order to start the internal combustion engine and that there is a possibility of decreasing of the output voltage of the first power source), it is possible to keep the vehicle being capable of being driven.

DESCRIPTION OF THE EMBODIMENTS

Hereinafter, a vehicle electric power supply apparatus according to an embodiment of the present invention will be described with reference to the accompanying drawings.

Figure 1:
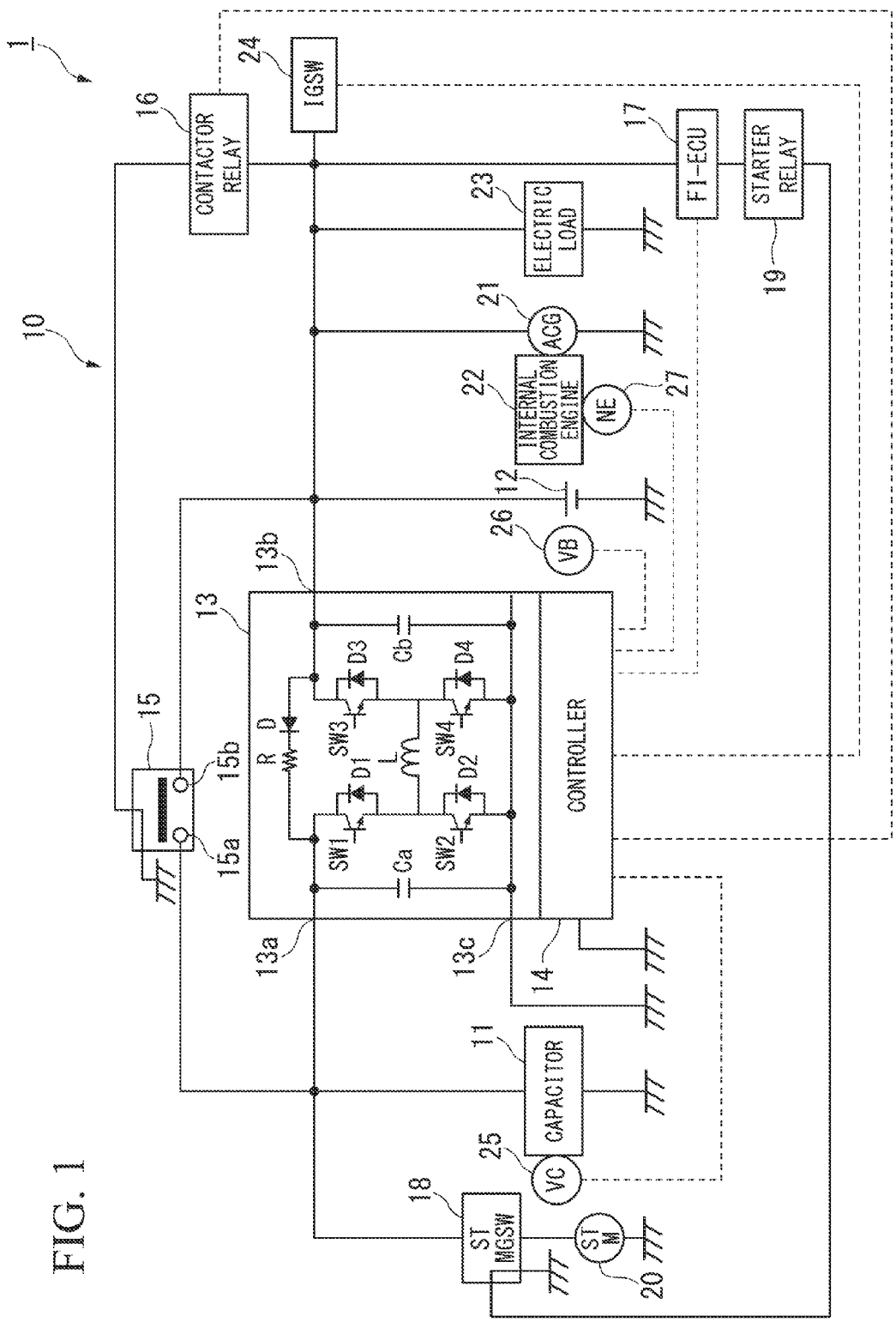
FIG. 1 is a configuration diagram of a vehicle electric power supply apparatus and a vehicle in which the vehicle electric power supply apparatus is mounted according to the embodiment of the present invention.

A vehicle electric power supply apparatus 10 according to the present embodiment is, for example, as shown in FIG. 1, mounted in a vehicle 1. The vehicle electric power supply apparatus 10 includes at least a capacitor 11 (second power source) as a secondary battery, a battery 12 (first power source), a DC-DC converter 13, a controller 14 (control unit, idle stopping unit), a contactor 15 (switch), and a contactor relay 16 (opening and closing unit).

The vehicle 1 includes the vehicle electric power supply apparatus 10, an FI-ECU 17 (idle stopping unit), a starter magnet switch (STMGSW) 18, a starter relay 19, a starter motor (STM) 20 (second electric load, electric motor), a generator (ACG) 21, an internal combustion engine 22, an electric load 23 (first electric load), an ignition switch (IGSW) 24, a first voltage sensor 25 (voltage detection unit), a second voltage sensor 26 (voltage detection unit), and a rotation frequency sensor 27 (rotation frequency detection unit).

The capacitor 11 is, for example, an electric double layer capacitor, an electrolytic capacitor, a lithium-ion capacitor, and the like and is connected to the starter magnet switch 18. The capacitor 11 is connected to a first input-output terminal 13a of the DC-DC converter 13 and a first terminal 15a of the contactor 15. The capacitor 11 is configured to be capable of being electrically connected to the battery 12, the contactor relay 16, the FI-ECU 17, the generator 21, the electric load 23, and the ignition switch 24 via the DC-DC converter 13 or the contactor 15.

The battery 12 is, for example, a lead battery of a predetermined voltage (12V or the like) and the like and is connected to the contactor relay 16, the FI-ECU 17, the generator 21, the electric load 23, and the ignition switch 24. The battery 12 is connected to a second input-output terminal 13b of the DC-DC converter 13 and a second terminal 15b of the contactor 15. The battery 12 is configured to be capable of being electrically connected to the capacitor 11 and the starter magnet switch 18 via the DC-DC converter 13 or the contactor 15.

The DC-DC converter 13 is capable of increasing or decreasing voltage bi-directionally between the first input-output terminal 13a and the second input-output terminal 13b by the control of the controller 14. The DC-DC converter 13 charges the capacitor 11 by supplying the generated electric power that is produced by the generator 21 at the time of running of the internal combustion engine 22 or the regenerated electric power that is produced by the generator 21 at the time of braking of the vehicle 1 to the capacitor 11. In addition, the DC-DC converter 13 discharges the capacitor 11 by supplying the electric power stored in the capacitor 11 to at least the battery 12 or the electric load 23.

The DC-DC converter 13 is, for example, an H-bridge step-up/step-down DC-DC converter and includes four first to fourth switching devices (for example, IGBT: Insulated Gate Bipolar mode Transistor) SW1, SW2, SW3, and SW4 that are connected in a bridge form.

The first switching device SW1 and the second switching device SW2 are paired and are connected in series between the first input-output terminal 13a and a ground terminal 13c. That is, a collector of the first switching device SW1 is connected to the first input-output terminal 13a, an emitter of the first switching device SW1 is connected to a collector of the second switching device SW2, and an emitter of the second switching device SW2 is connected to the ground terminal 13c.

The third switching device SW3 and the fourth switching device SW4 are paired and are connected in series between the second input-output terminal 13b and the ground terminal 13c. That is, a collector of the third switching device SW3 is connected to the second input-output terminal 13b, an emitter of the third switching device SW3 is connected to a collector of the fourth switching device SW4, and an emitter of the fourth switching device SW4 is connected to the ground terminal 13c.

Each of first to fourth diodes D1 to D4 is connected between the emitter and the collector of each of the switching devices SW1, SW2, SW3, and SW4 such that the direction from the emitter to the collector is the forward direction.

The DC-DC converter 13 includes a reactor L that is connected between a connecting point of the first switching device SW1 and the second switching device SW2 and a connecting point of the third switching device SW3 and the fourth switching device SW4. In addition, the DC-DC converter 13 includes a first capacitor Ca that is connected between the first input-output terminal 13a and the ground terminal 13c, and a second capacitor Cb that is connected between the second input-output terminal 13b and the ground terminal 13c.

The DC-DC converter 13 includes a resistance R and a diode D which are connected in series such that the resistance R and the diode D directly connect the first input-output terminal 13a and the second input-output terminal 13b. The diode D is provided such that the direction toward the first input-output terminal 13a from the second input-output terminal 13b is the forward direction of the diode.

The DC-DC converter 13 is driven by a signal which is output from the controller 14 and is input to a gate of each of the switching devices SW1, SW2, SW3, and SW4.

The controller 14 controls the bi-directional voltage increasing/decreasing operation of the DC-DC converter 13 and connection and disconnection operations of the contactor 15 by the contactor relay 16. Moreover, the controller 14 controls execution permission and execution inhibition of idle stopping by the FI-ECU 17 and outputs a control command that commands execution permission and execution inhibition of idle stopping to the FI-ECU 17.

The controller 14 is capable of detecting the internal resistance and the capacitance of the capacitor 11 and determining whether or not the internal resistance is a predetermined value or more and is also capable of determining whether or not the capacitor 11 is degraded based on the internal resistance. The controller 14 is connected to the first voltage sensor 25 that detects the output voltage VC of the capacitor 11, a current sensor (not shown in the drawing) that detects the charge current and the discharge current of the capacitor 11, and a temperature sensor (not shown in the drawing) that detects the temperature of the capacitor 11.

The controller 14 is capable of controlling the discharge of the battery 12 and the depth of discharge of the battery 12. The controller 14 is connected to the second voltage sensor 26 that detects the output voltage VB of the battery 12, a current sensor (not shown in the drawing) that detects the charge current and the discharge current of the battery 12, and a temperature sensor (not shown in the drawing) that detects the temperature of the battery 12.

The contactor 15 switches between connection and disconnection of the first terminal 15a and the second terminal 15b of the contactor 15 corresponding to an ON state and an OFF state of the contactor relay 16. The controller 14 controls an ON state and an OFF state of the contactor relay 16.

Note that, the first terminal 15a of the contactor 15 is connected to the first input-output terminal 13a of the DC-DC converter 13, a positive pole terminal of the capacitor 11, and the starter magnet switch 18. The second terminal 15b of the contactor 15 is connected to the second input-output terminal 13b of the DC-DC converter 13, a positive pole terminal of the battery 12, the generator 21, and the electric load 23. Thereby, in a connecting state, the contactor 15 connects each of the capacitor 11 and the battery 12 in parallel to the starter magnet switch 18 and the starter motor 20 that are connected in series. Note that, a negative pole terminal of the capacitor 11 and a negative pole terminal of the battery 12 are grounded.

The FI-ECU 17 is, for example, an ECU (Electronic Control Unit) that is configured by an electronic circuit such as a CPU (Central Processing Unit) and performs various controls relating to operations of the internal combustion engine 22 such as fuel supply and ignition timing. The FI-ECU 17 controls starting and stopping of the internal combustion engine 22 by a start request signal and a stop request signal that are output from the ignition switch 24 corresponding to the operation of the driver.

The FI-ECU 17 controls idle stopping of the internal combustion engine 22. In the idle stopping, the internal combustion engine 22 in a running state is automatically and temporarily stopped corresponding to establishment of a predetermined pause condition, and the internal combustion engine 22 in a pause state is automatically restarted corresponding to establishment of a predetermined return condition. The predetermined pause condition is, for example, a condition in which the vehicle speed of the vehicle 1 is zero, an accelerator pedal opening degree is zero, and a brake pedal switch is ON. The predetermined return condition is, for example, a condition in which the brake pedal switch is OFF.

The FI-ECU 17 starts the internal combustion engine 22 by controlling the starter relay 19 to be ON corresponding to the start request by the signal output from the ignition switch 24 or a return request from the pause state of idle stopping. The FI-ECU 17 controls the power generation operation of the generator (ACG) 21 and arbitrarily changes the generated voltage of the generator 21.

The generator 21 is, for example, an AC generator linked to a crankshaft (not shown in the drawing) of the internal combustion engine 22 via a belt or the like. The generator 21 generates electric power using the power of the internal combustion engine 22 in operation and thereby outputs the generated electric power. When the vehicle 1 is decelerated, is running in a state where fuel supply is stopped, or the like, the generator 21 converts kinetic energy of the vehicle body transmitted from drive wheels (not shown in the drawing) of the vehicle 1 into electric energy (regenerated energy) and outputs the regenerated electric power. Note that, the generator 21 includes a rectifier (not shown in the drawing) that rectifies an AC output by electric power generation and regeneration into a DC output or the like.

The generator 21 is grounded and also is connected to the second input-output terminal 13b of the DC-DC converter 13.

The internal combustion engine 22 is started by the driving force of the starter motor (STM) 20. The starter motor 20 is driven to rotate by the application of voltage from the capacitor 11 or the battery 12 via the starter magnet switch (STMGSW) 18. The starter magnet switch 18 switches between the presence and absence of electric power supplied to the starter motor 20 corresponding to an ON state and an OFF state of the starter relay 19. The FI-ECU 17 controls an ON state and an OFF state of the starter relay 19.

The starter motor 20, for example, includes a pinion gear (not shown in the drawing) in a rotating shaft (not shown in the drawing). The internal combustion engine 22, for example, includes a ring gear (not shown in the drawing) that engages with the pinion gear of the starter motor 20 in the crankshaft (not shown in the drawing). Thereby, the starter motor 20 is capable of transmitting the driving force to the internal combustion engine 22 by engaging the pinion gear with the ring gear of the internal combustion engine 22.

The electric load 23 is one of a variety of auxiliary machines mounted in the vehicle 1 or the like. The electric load 23 is grounded and is also connected to the second input-output terminal 13b of the DC-DC converter 13.

The vehicle electric power supply apparatus 10 according to the present embodiment includes the configuration described above. Next, operations of the vehicle electric power supply apparatus 10 will be described.

(Charging and Discharging Operations)

Hereinafter, charging and discharging operations of the capacitor 11 and the battery 12 controlled by the controller 14 will be described.

The controller 14 controls the bi-directional voltage increasing/decreasing operation of the DC-DC converter 13 and the connection and disconnection operations of the contactor 15 by the contactor relay 16 such that the output voltage of the capacitor 11 is matched with a predetermined target voltage corresponding to the driving state of the vehicle 1.

The controller 14 performs nine operation modes M0 to M8 as the charging and discharging operations of the capacitor 11 and the battery 12 corresponding to the driving of the vehicle 1 as shown in Table 1 below.

TABLE 1

| OPERATION MODE | OPERATION CONTENT |
|---|---|
| M0: STOPPING-PERIOD CHARGING MODE | CHARGE CAPACITOR DURING STOPPING PERIOD |
| M1: FIRST-TIME START-UP MODE | IGNITION SWITCH AND STARTER ON |
| M2: I/S PREPARATION CHARGING MODE | CHARGE CAPACITOR IN PREPARATION FOR I/S |
| M3: REGENERATION CHARGING MODE | CHARGE CAPACITOR DURING REGENERATION |
| M4: REGENERATION DISCHARGING MODE | DISCHARGE REGENERATED ELECTRIC POWER AND STOP ACG |

TABLE 1-continued

| OPERATION MODE | OPERATION CONTENT |
|---|---|
| M5: I/S ELECTRIC POWER SUPPLY (CAPACITOR) MODE | DISCHARGE ELECTRIC POWER FROM CAPACITOR TO ELECTRIC LOAD DURING I/S |
| M6: I/S ELECTRIC POWER SUPPLY (BATT) MODE | SUPPLY ELECTRIC POWER FROM BATTERY TO ELECTRIC LOAD |
| M7: ENG RESTARTING MODE | DISCHARGE CAPACITOR AND RESTART |
| M8: STOPPING-PERIOD MODE | SUPPRESS DEGRADATION OF CAPACITOR |

Figure 2:
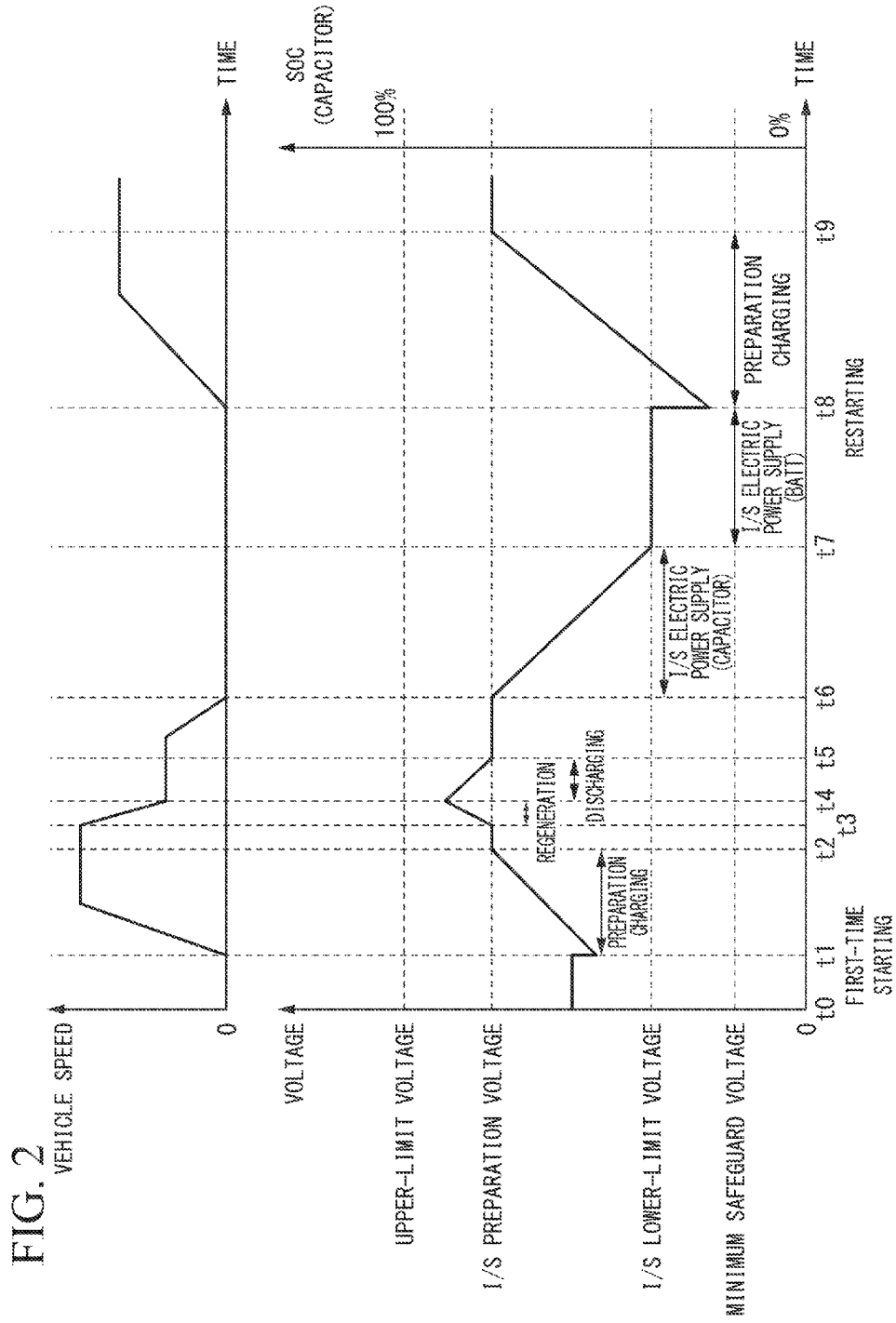
FIG. 2 is a diagram showing an example of the change of the output voltage of a capacitor based on a change of the driving state of the vehicle in which the vehicle electric power supply apparatus is mounted according to the embodiment of the present invention.
Figure 3:
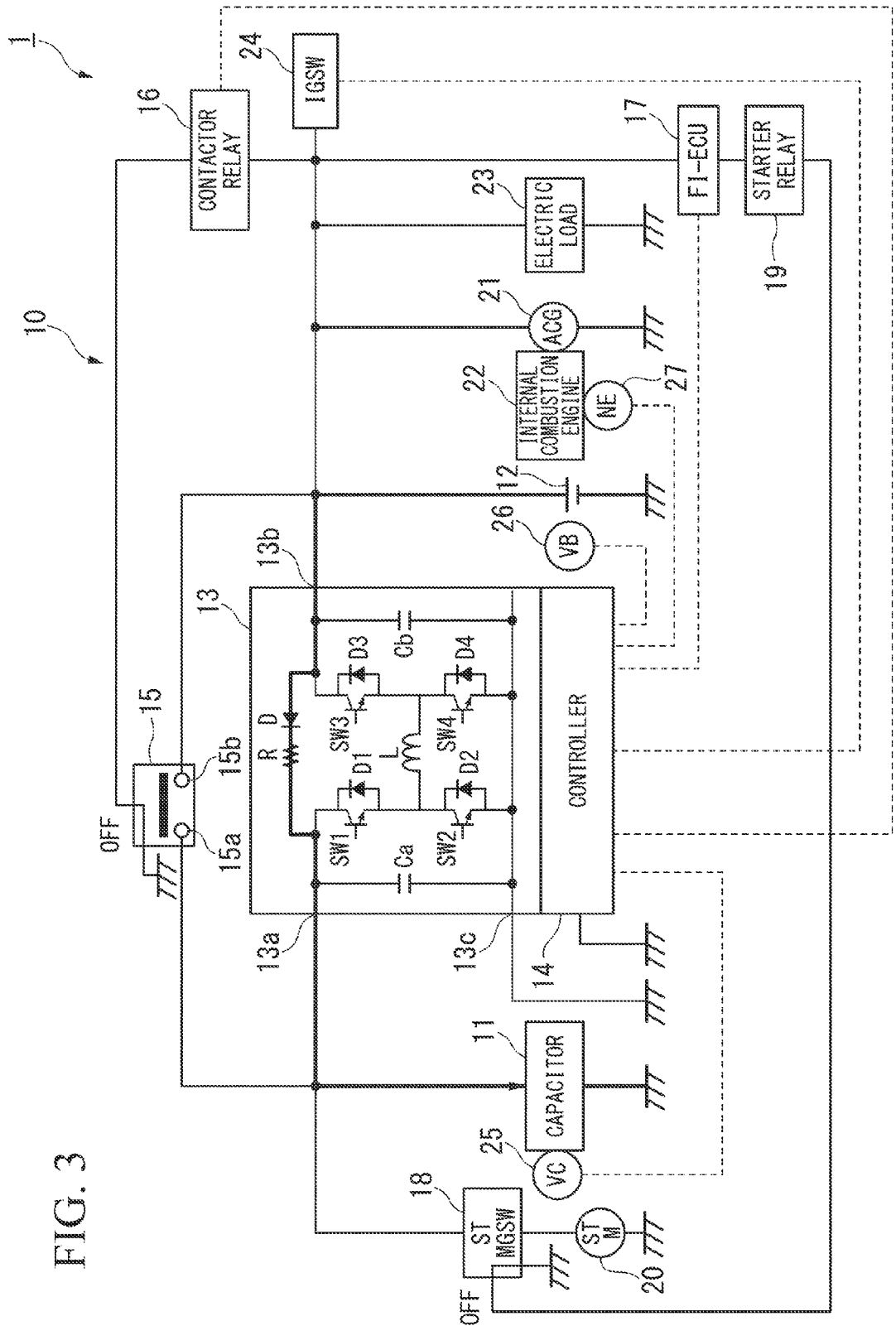
FIG. 3 is a diagram showing a current flow in a stopping-period charging mode performed by a controller of the vehicle electric power supply apparatus according to the embodiment of the present invention.

First, for example, as the period of time t0 to immediately before time t1 shown in FIG. 2, in a state where the ignition switch 24 is OFF, the controller 14 performs the operation of a stopping-period charging mode M0. In the stopping-period charging mode M0, as shown in FIG. 3, the controller 14 charges the capacitor 11 by electric power supply to the capacitor 11 from the battery 12 via the diode D and the resistance R of the DC-DC converter 13. Thereby, the controller 14 prevents the output voltage of the capacitor 11 (for example, corresponding to the voltage of the positive pole terminal with respect to the grounded negative pole terminal) from decreasing excessively.

Next, for example, as time t1 shown in FIG. 2, when the controller 14 receives a start request to start the internal combustion engine 22 by the signal output from the ignition switch 24, the controller 14 performs failure detection of the contactor 15 described later and then performs the operation of a first-time start-up mode M1.

In the first-time start-up mode M1, the controller 14 first sets the contactor 15 to be in a disconnecting state by setting the contactor relay 16 to OFF, and in the disconnecting state of the contactor 15, the controller 14 sets the starter magnet switch 18 to be in a connecting state by setting the starter relay 19 to ON. Thereby, the controller 14 drives the starter motor 20 by electric power supply from only the capacitor 11.

Figure 4:
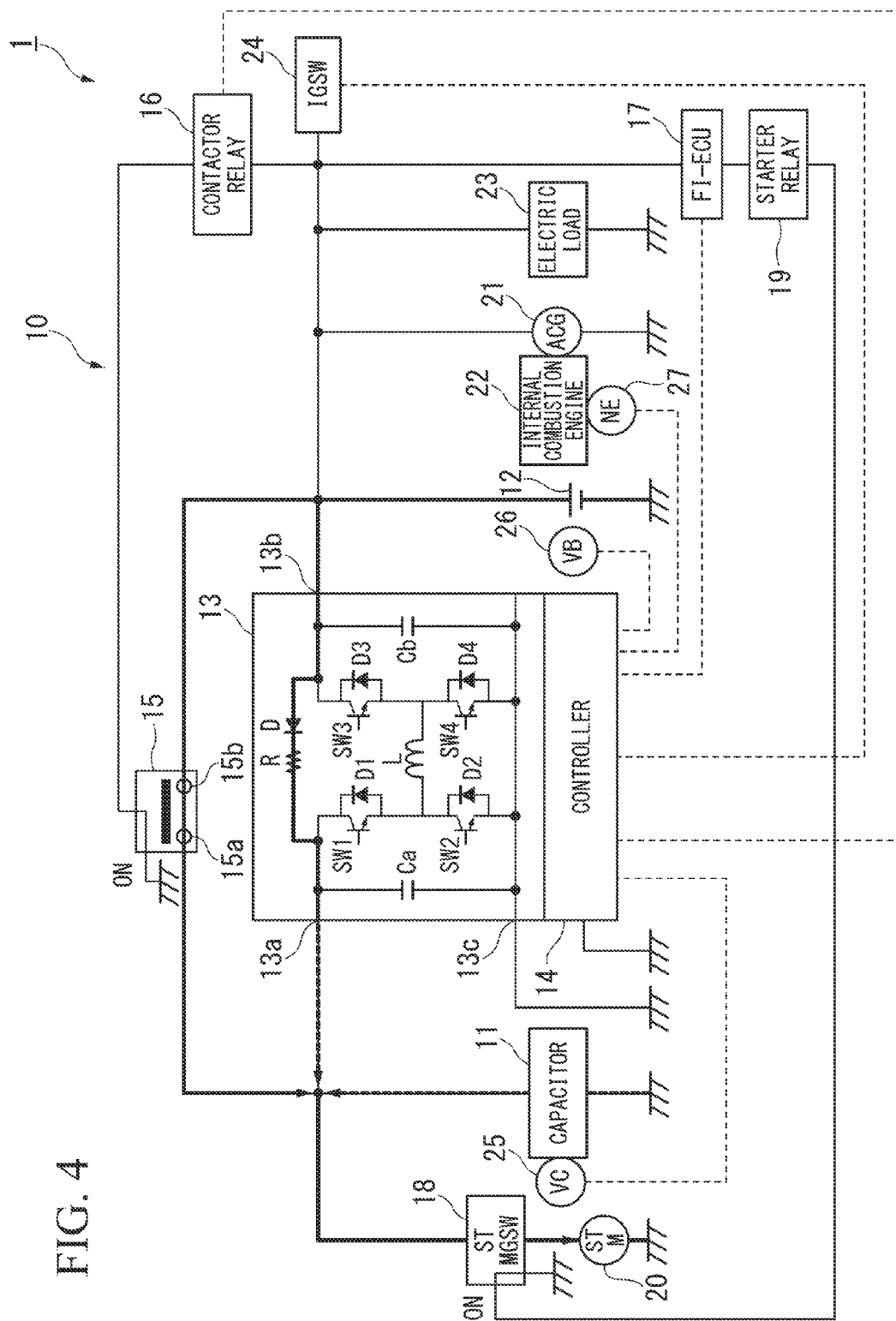
FIG. 4 is a diagram showing a current flow in a first-time start-up mode performed by the controller of the vehicle electric power supply apparatus according to the embodiment of the present invention.

At this time, in the case that a predetermined condition described later is established, the controller 14 sets the contactor 15 to be in a connecting state by setting the contactor relay 16 to ON. Thereby, as shown in FIG. 4, the controller 14 connects each of the capacitor 11 and the battery 12 in parallel to the starter magnet switch 18 and the starter motor 20 that are connected in series. Then, the controller 14 drives the starter motor 20 by electric power supply from the capacitor 11 and the battery 12 and starts the internal combustion engine 22 using the driving force of the starter motor 20.

Note that, in the first-time start-up mode M1, for example, as time t1 shown in FIG. 2, the output voltage and the remaining capacity SOC of the capacitor 11 decreases due to electric power supply from the capacitor 11 to the starter motor 20.

Figure 5:
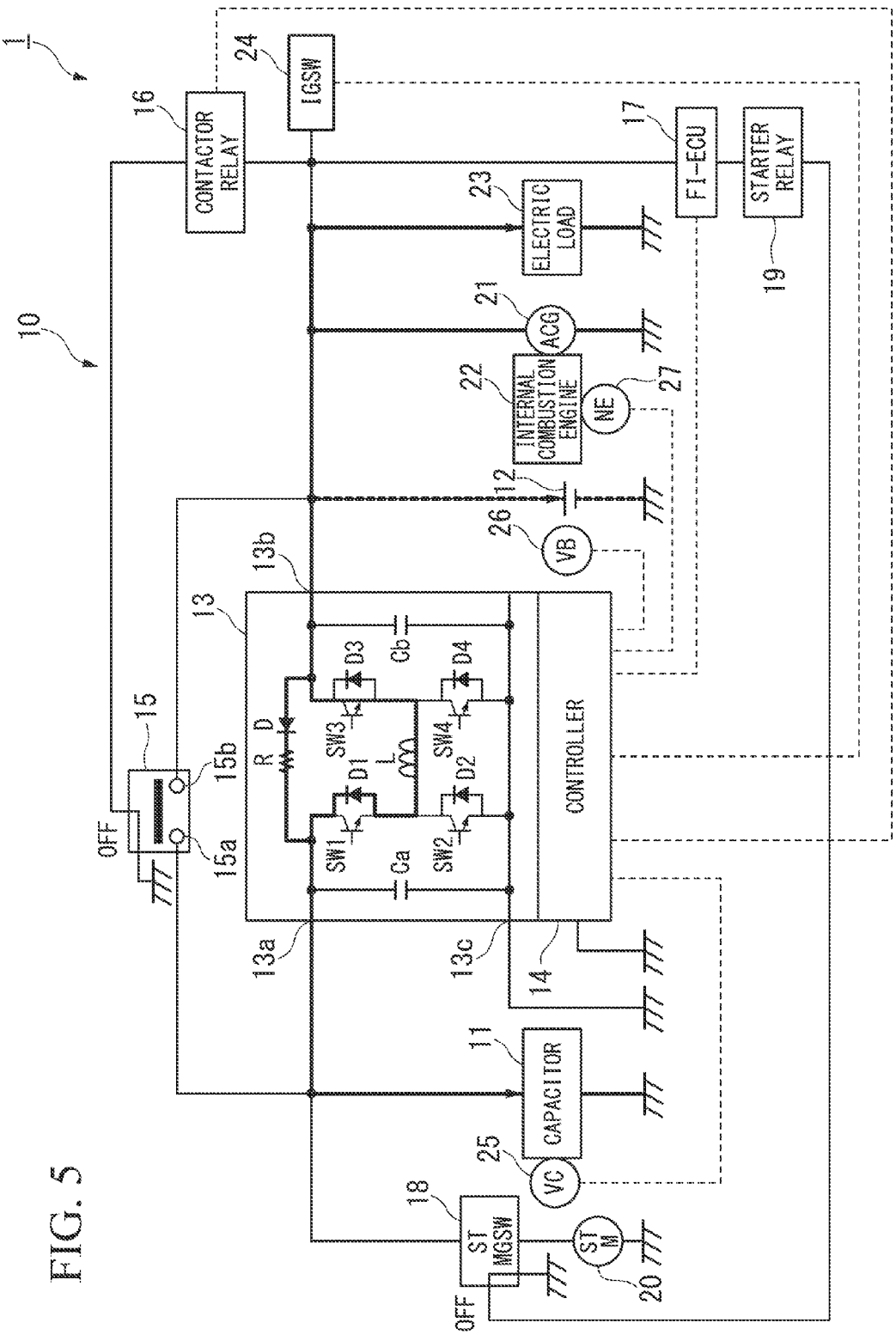
FIG. 5 is a diagram showing a current flow in an I/S preparation charging mode performed by the controller of the vehicle electric power supply apparatus according to the embodiment of the present invention.

Next, for example, as the period of time t1 to time t2 shown in FIG. 2, in a state where the vehicle 1 is in a running state other than deceleration and where there is no execution command of idle stopping, the controller 14 performs the operation of an I/S preparation charging mode M2. In the I/S preparation charging mode M2, as shown in FIG. 5, the controller 14 charges the capacitor 11 by electric power supply to the capacitor 11 from the generator 21 via the DC-DC converter 13 using the generated electric power output from the generator 21 that generates electric power by the drive power of the internal combustion engine 22 in a running state. Moreover, electric power is supplied from the generator 21 to the electric load 23 and also is supplied from the generator 21 to the battery 12 corresponding to the state of the battery 12.

In more detail, the controller 14 sets the contactor 15 to be in a disconnecting state by setting the contactor relay 16 to OFF and sets the starter magnet switch 18 to be in a disconnecting state by setting the starter relay 19 to OFF. The controller 14 applies a current to the diode D and the resistance R and also applies a current to the third switching device SW3 in an ON state, the reactor L, and the first diode D1 in between the second input-output terminal 13b and the first input-output terminal 13a of the DC-DC converter 13. The controller 14 charges the capacitor 11 at least until the output voltage of the capacitor 11 reaches a predetermined I/S preparation voltage such that electric power required to restart the internal combustion engine 22 is stored in the capacitor 11 in preparation for execution of idle stopping.

Note that, the predetermined I/S preparation voltage is, for example, an output voltage corresponding to the remaining capacity SOC of the capacitor 11 capable of performing electric power supply required for the electric load 23 and the like in the pause state of the internal combustion engine 22 over a predetermined period of time due to idle stopping.

Figure 6:
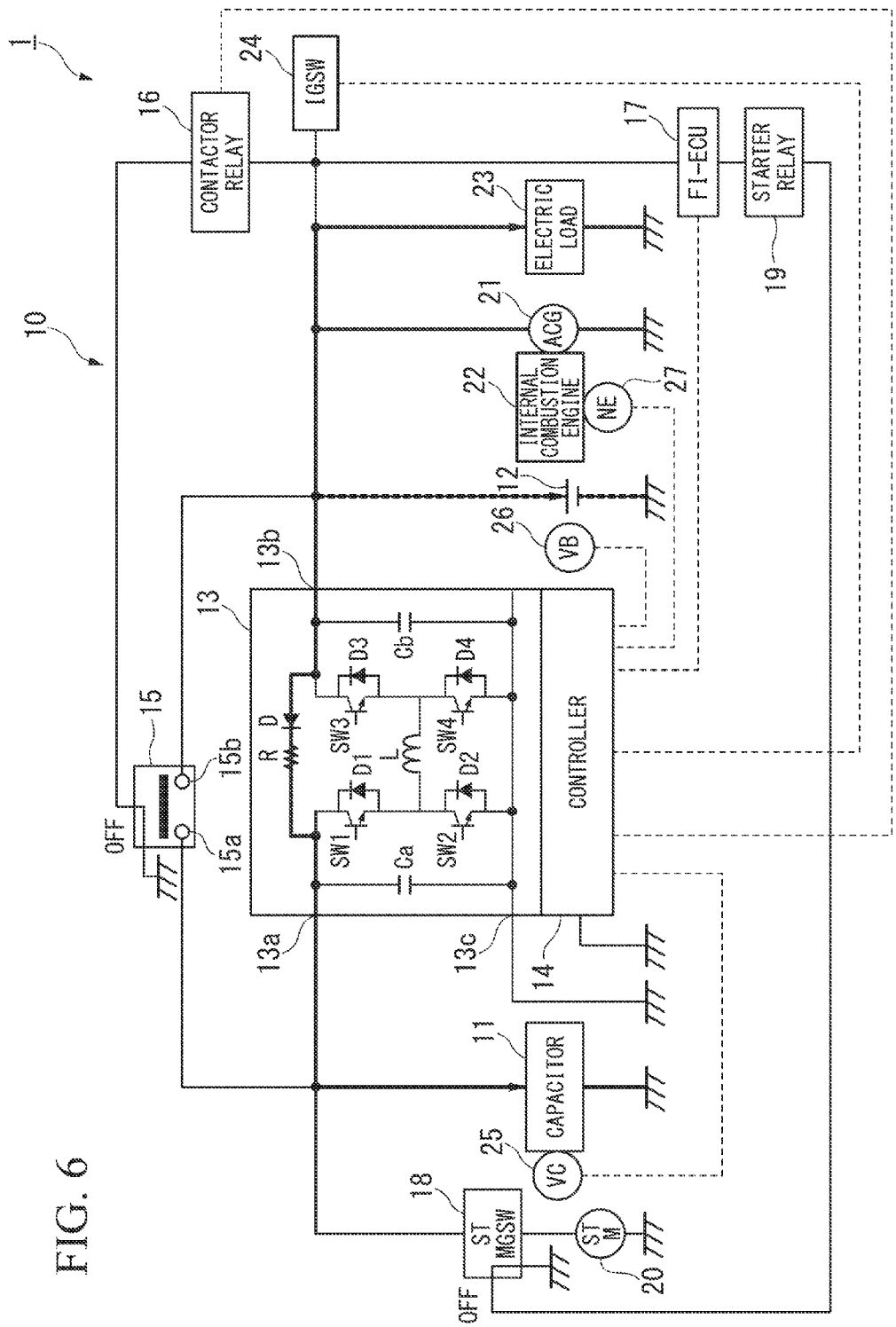
FIG. 6 is a diagram showing a current flow when the output voltage of the capacitor reaches a predetermined I/S preparation voltage in the I/S preparation charging mode performed by the controller of the vehicle electric power supply apparatus according to the embodiment of the present invention.

Moreover, for example, as the period of time t2 to time t3 shown in FIG. 2, in a state where the vehicle 1 is in a running state other than deceleration, where there is no execution command of idle stopping, and where the output voltage of the capacitor 11 has reached the predetermined I/S preparation voltage, the controller 14 continues to perform the operation of the I/S preparation charging mode M2. In this case, as shown in FIG. 6, the controller 14 switches the third switching device SW3 from the ON state to the OFF state and applies a current to the diode D and the resistance R in between the second input-output terminal 13b and the first input-output terminal 13a of the DC-DC converter 13. Thereby, the controller 14 maintains the output voltage of the capacitor 11 at the predetermined I/S preparation voltage.

Figure 7:
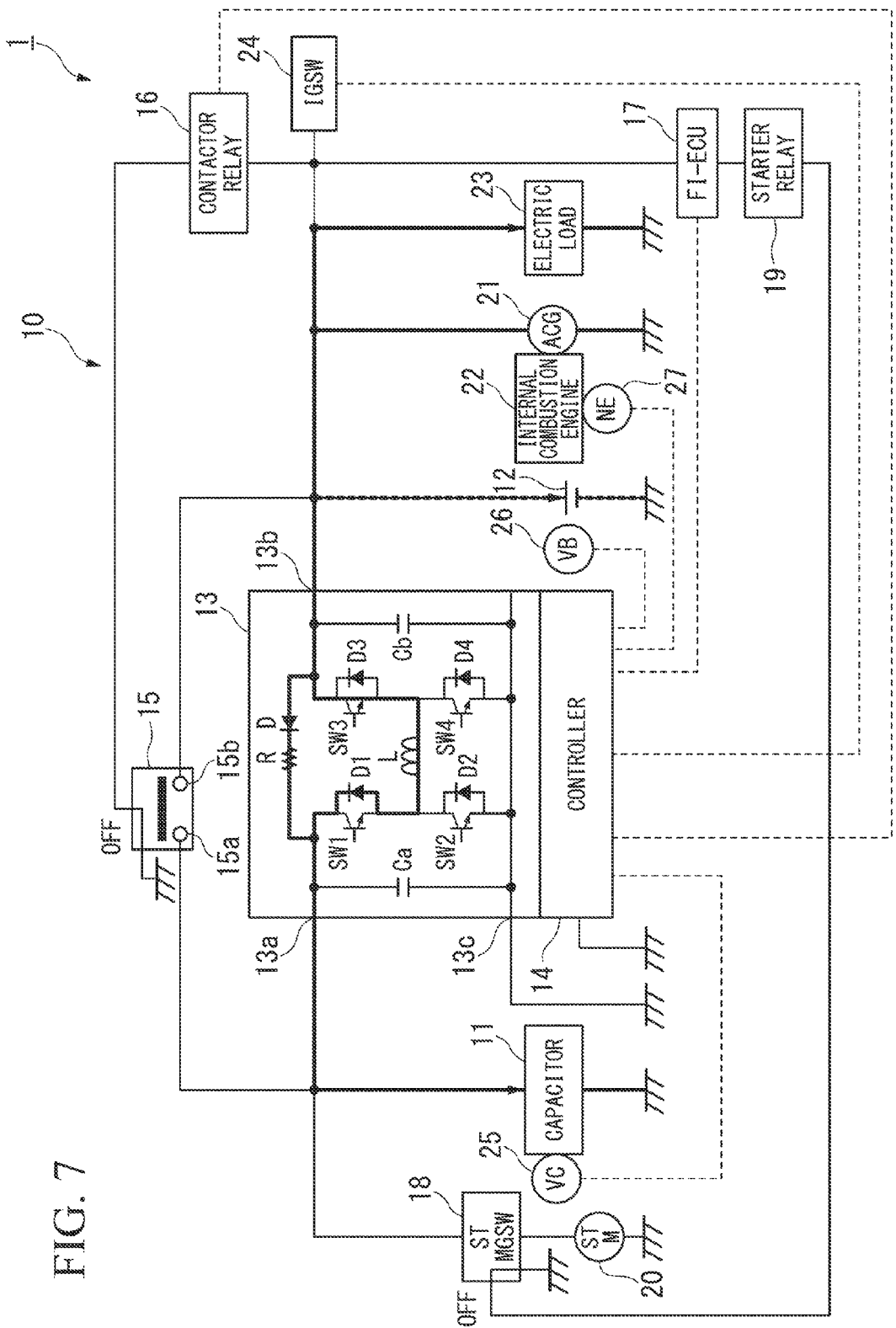
FIG. 7 is a diagram showing a current flow in a regeneration charging mode performed by the controller of the vehicle electric power supply apparatus according to the embodiment of the present invention.

Next, for example, as the period of time t3 to time t4 shown in FIG. 2, in a state where fuel supply is stopped such as when the vehicle 1 is decelerated, the controller 14 performs the operation of a regeneration charging mode M3. In the regeneration charging mode M3, as shown in FIG. 7, the controller 14 charges the capacitor 11 by electric power supply to the capacitor 11 from the generator 21 via the DC-DC converter 13 using the regenerated electric power output from the generator 21 when the vehicle 1 is decelerated or the like. Moreover, electric power is supplied from the generator 21 to the electric load 23 and also is supplied from the generator 21 to the battery 12 corresponding to the state of the battery 12. The controller 14 converts kinetic energy of the vehicle body transmitted from drive wheels (not shown in the drawing) of the vehicle 1 into electric energy (regenerated energy) by the generator 21 and produces the regenerated electric power.

In more detail, the controller 14 sets the contactor 15 to be in a disconnecting state by setting the contactor relay 16 to OFF and sets the starter magnet switch 18 to be in a disconnecting state by setting the starter relay 19 to OFF. The controller 14 applies a current to the diode D and the resistance R and also applies a current to the third switching device SW3 in an ON state, the reactor L, and the first diode D1 in between the second input-output terminal 13*b* and the first input-output terminal 13*a* of the DC-DC converter 13. The controller 14 charges the capacitor 11 at least in a range in which the output voltage of the capacitor 11 is a predetermined upper-limit voltage or less.

Note that, the predetermined upper-limit voltage is greater than the I/S preparation voltage and is, for example, an output voltage corresponding to a full charge state (namely, remaining capacity SOC=100%).

Figure 8:
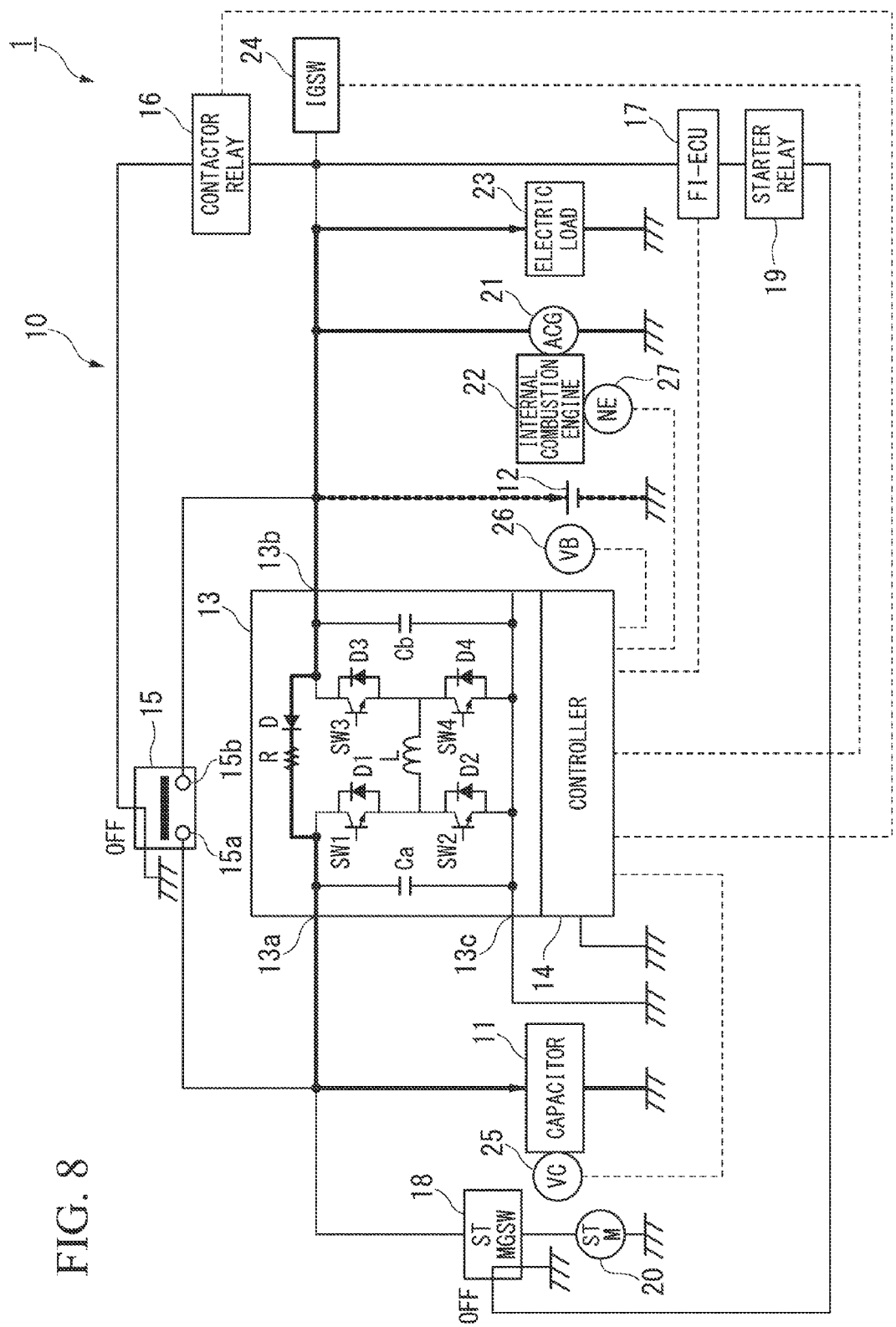
FIG. 8 is a diagram showing a current flow when the output voltage of the capacitor reaches a predetermined upper-limit voltage in the regeneration charging mode performed by the controller of the vehicle electric power supply apparatus according to the embodiment of the present invention.

Moreover, in a state where fuel supply is stopped such as when the vehicle 1 is decelerated and where the output voltage of the capacitor 11 has reached the predetermined upper-limit voltage, the controller 14 continues to perform the operation of the regeneration charging mode M3. In this case, as shown in FIG. 8, the controller 14 switches the third switching device SW3 from the ON state to the OFF state and applies a current to the diode D and the resistance R in between the second input-output terminal 13*b* and the first input-output terminal 13*a* of the DC-DC converter 13. Thereby, the controller 14 maintains the output voltage of the capacitor 11 at the predetermined upper-limit voltage.

Figure 9:
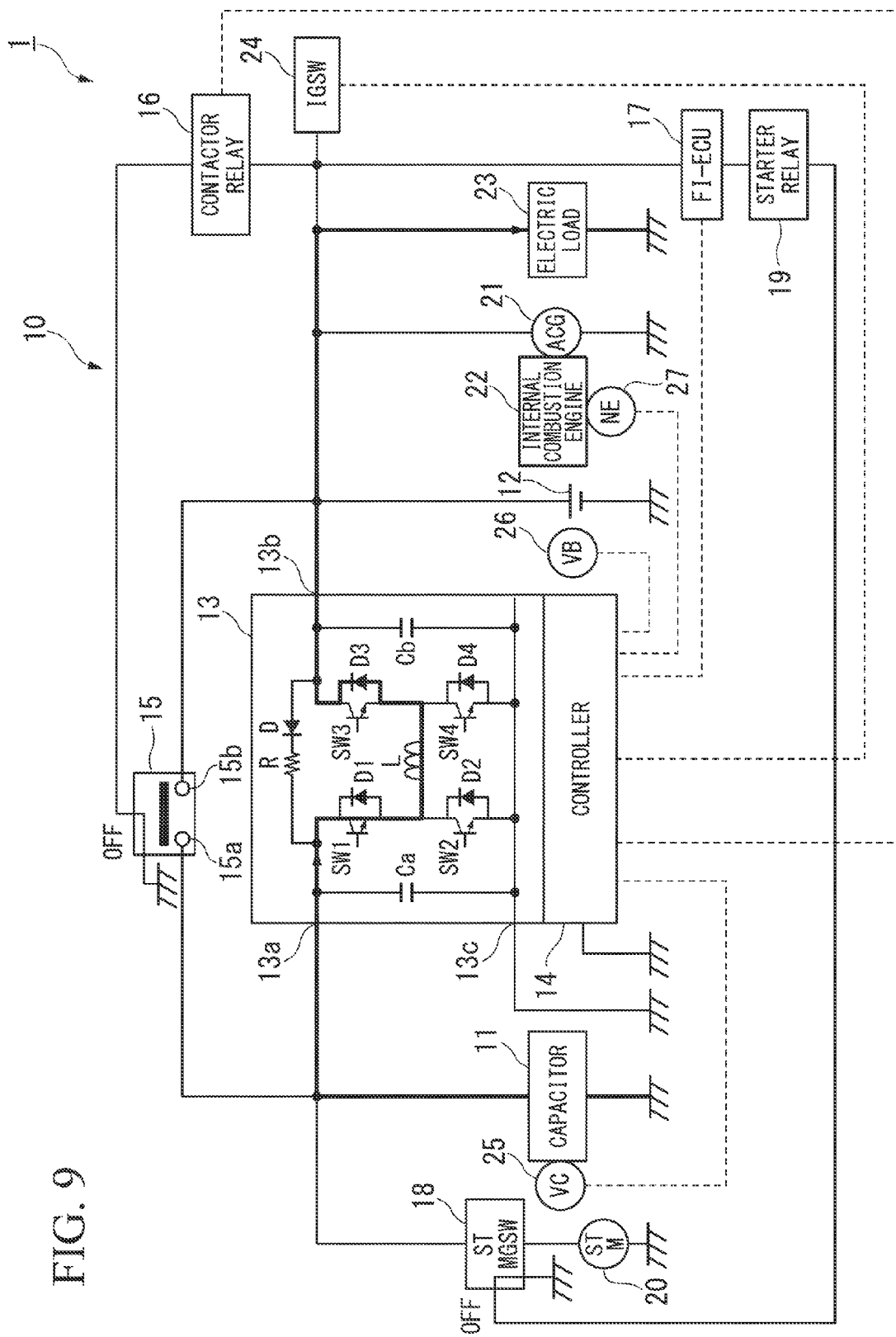
FIG. 9 is a diagram showing a current flow in a regeneration discharging mode performed by the controller of the vehicle electric power supply apparatus according to the embodiment of the present invention.

Next, for example, as the period of time t4 to time t5 shown in FIG. 2, in a state where the vehicle 1 is running at a constant speed or the like and where there is no execution command of idle stopping, the controller 14 performs the operation of a regeneration discharging mode M4. In the regeneration discharging mode M4, as shown in FIG. 9, the controller 14 discharges the capacitor 11 by electric power supply from the capacitor 11 to the electric load 23 via the DC-DC converter 13 using the regenerated electric power stored in the capacitor 11 exceeding the predetermined I/S preparation voltage.

In more detail, the controller 14 sets the contactor 15 to be in a disconnecting state by setting the contactor relay 16 to OFF and sets the starter magnet switch 18 to be in a disconnecting state by setting the starter relay 19 to OFF. The controller 14 applies a current to the first switching device SW1 in an ON state, the reactor L, and the third diode D3 in between the first input-output terminal 13*a* and the second input-output terminal 13*b* of the DC-DC converter 13. The controller 14 discharges the capacitor 11 at least until the output voltage of the capacitor 11 reaches the predetermined I/S preparation voltage. At this time, the controller 14 stops electric power generation and regeneration of the generator 21 or sets the output voltage of the generator 21 to a voltage lower than a specified voltage at normal operations.

Figure 10:
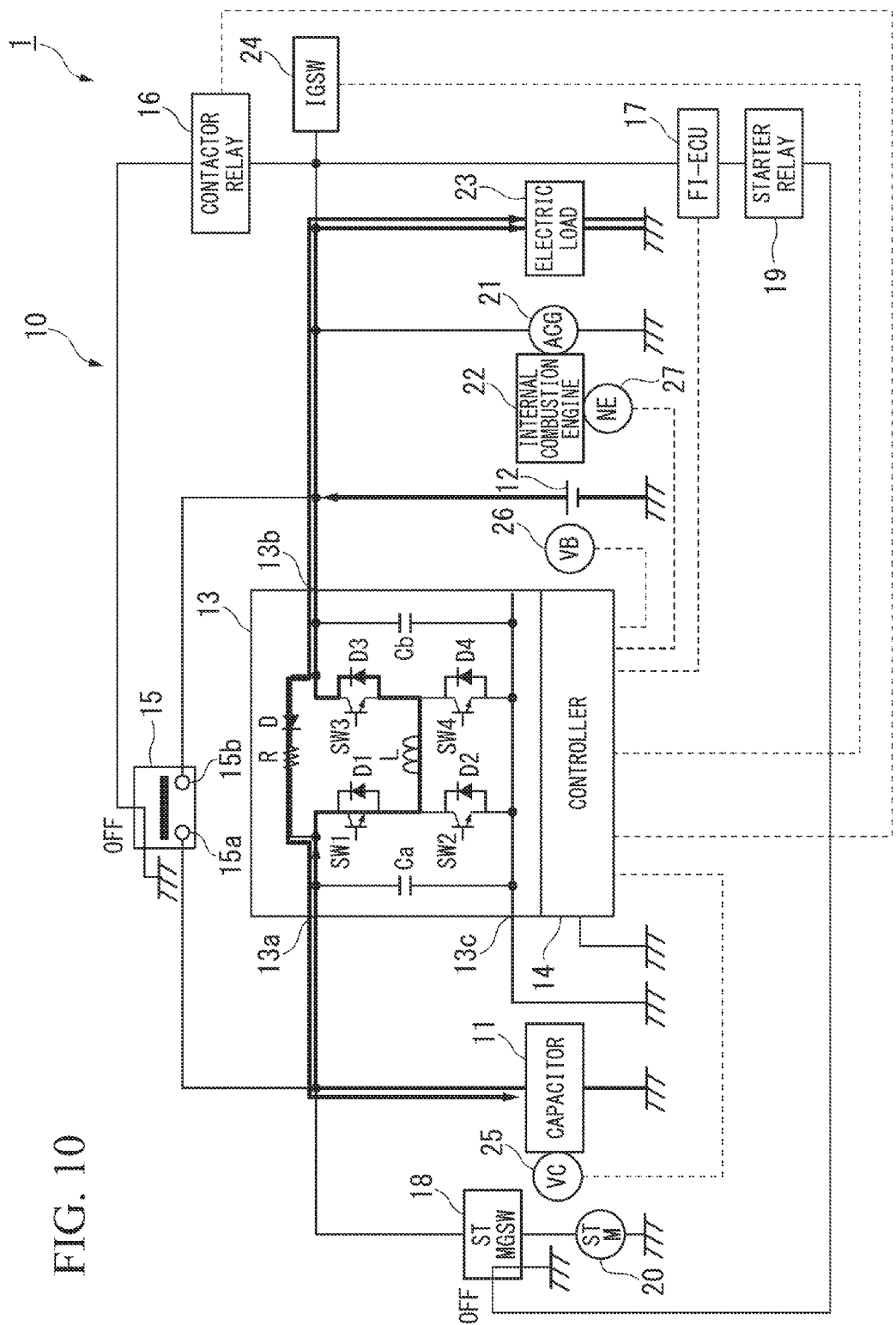
FIG. 10 is a diagram showing a current flow in an I/S electric power supply (capacitor) mode performed by the controller of the vehicle electric power supply apparatus according to the embodiment of the present invention.

Next, for example, as the period of time t6 to time t7 shown in FIG. 2, in a state of stopping of the vehicle 1 (a state where the vehicle speed is zero) and executing idle stopping, the controller 14 performs the operation of an I/S electric power supply (capacitor) mode M5. In the I/S electric power supply (capacitor) mode M5, as shown in FIG. 10, in the pause state of the internal combustion engine 22 due to idle stopping of the vehicle 1, the controller 14 discharges the capacitor 11 by electric power supply from the capacitor 11 to the electric load 23 via the DC-DC converter 13 using the electric power stored in the capacitor 11 exceeding a predetermined I/S lower-limit voltage.

In more detail, the controller 14 sets the contactor 15 to be in a disconnecting state by setting the contactor relay 16 to OFF and sets the starter magnet switch 18 to be in a disconnecting state by setting the starter relay 19 to OFF. The controller 14 applies a current to the first switching device SW1 in an ON state, the reactor L, and the third diode D3 in between the first input-output terminal 13*a* and the second input-output terminal 13*b* of the DC-DC converter 13. The controller 14 discharges the capacitor 11 at least until the output voltage of the capacitor 11 reaches the predetermined I/S lower-limit voltage while securing electric power required to restart the internal combustion engine 22 corresponding to a return request.

Note that, the predetermined I/S lower-limit voltage is smaller than the I/S preparation voltage and is, for example, an output voltage corresponding to a remaining capacity SOC capable of performing appropriate electric power supply required to restart the internal combustion engine 22 in the pause state by the driving force of the starter motor 20. In addition, appropriate electric power supply by the capacitor 11 means that the capacitor 11 is discharged such that the output voltage of the capacitor 11 is not decreased to less than a predetermined minimum safeguard voltage. Therefore, as shown in FIG. 10, the controller 14 is capable of charging the capacitor 11 by electric power supply to the capacitor 11 from the battery 12 via the diode D and the resistance R of the DC-DC converter 13 in addition to electric power supply to the electric load 23 from the battery 12. Thereby, the controller 14 prevents the output voltage of the capacitor 11 from decreasing to a voltage less than the predetermined minimum safeguard voltage. Note that, the minimum safeguard voltage is smaller than the I/S lower-limit voltage and is, for example, an output voltage required to maintain the capacitor 11 in an adequate state.

Figure 11:
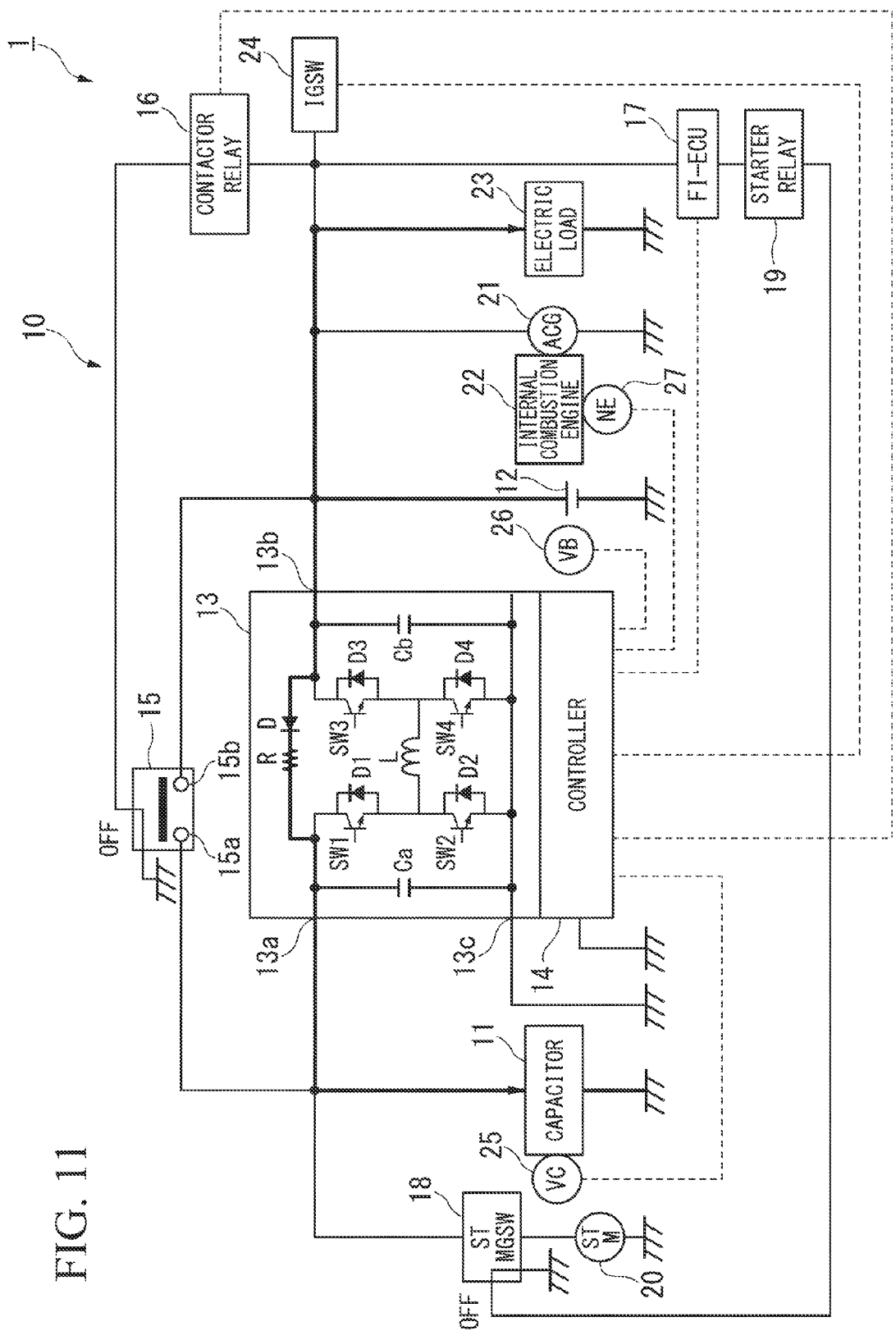
FIG. 11 is a diagram showing a current flow in an I/S electric power supply (BATT) mode performed by the controller of the vehicle electric power supply apparatus according to the embodiment of the present invention.

Next, for example, as the period of time t7 to immediately before time t8 shown in FIG. 2, in a state of stopping of the vehicle 1 (a state where the vehicle speed is zero) and idle stopping and where the output voltage of the capacitor 11 has reached the predetermined I/S lower-limit voltage, the controller 14 performs the operation of an I/S electric power supply (BATT) mode M6. In the I/S electric power supply (BATT) mode M6, as shown in FIG. 11, in the pause state of the internal combustion engine 22 due to idle stopping of the vehicle 1, the controller 14 charges the capacitor 11 by electric power supply from the battery 12 to the capacitor 11 via the DC-DC converter 13 using electric power stored in the battery 12. Moreover, electric power is supplied from the battery 12 to the electric load 23.

In more detail, the controller 14 sets the contactor 15 to be in a disconnecting state by setting the contactor relay 16 to OFF and sets the starter magnet switch 18 to be in a disconnecting state by setting the starter relay 19 to OFF. The controller 14 switches the first switching device SW1 from the ON state to the OFF state and applies a current to the diode D and the resistance R in between the second input-output terminal 13*b* and the first input-output terminal 13*a* of the DC-DC converter 13. Thereby, the controller 14 maintains the output voltage of the capacitor 11 at the predetermined I/S lower-limit voltage and inhibits discharging from the capacitor 11 in which the minimum electric power required to restart the internal combustion engine 22 corresponding to a return request is secured.

Figure 12:
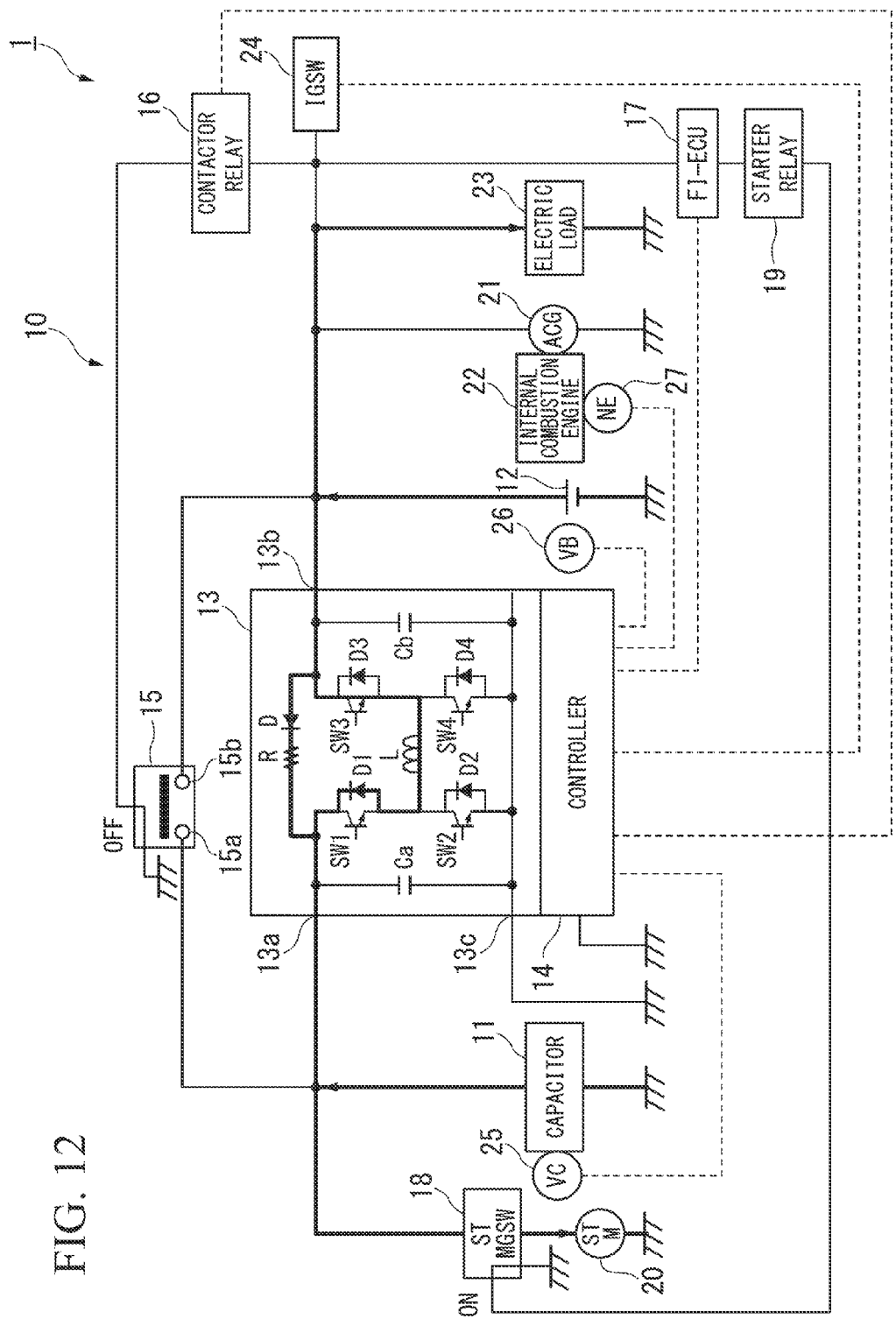
FIG. 12 is a diagram showing a current flow in an ENG restarting mode performed by the controller of the vehicle electric power supply apparatus according to the embodiment of the present invention.

Next, for example, as time t8 shown in FIG. 2, when the controller 14 receives a return request that requests to restart the internal combustion engine 22 in the pause state due to idle stopping, the controller 14 performs the operation of an ENG restarting mode M7. In the ENG restarting mode M7, as shown in FIG. 12, the controller 14 sets the contactor 15 to be in a disconnecting state by setting the contactor relay 16 to OFF and sets the starter magnet switch 18 to be in a connecting state by setting the starter relay 19 to ON. The controller 14 drives the starter motor 20 by electric power supply from only the capacitor 11 connected in parallel to the starter magnet switch 18 and the starter motor 20 that are connected in series and restarts the internal combustion engine 22 by the driving force of the starter motor 20.

The controller 14 supplies electric power from the battery 12 to the electric load 23 and also charges the capacitor 11 by electric power supply from the battery 12 to the capacitor 11 via the DC-DC converter 13. Thereby, the controller 14 prevents the output voltage of the capacitor 11 from decreasing to less than the predetermined minimum safeguard voltage if the output voltage and the remaining capacity SOC of the capacitor 11 decreases due to electric power supplied from the capacitor 11 to the starter motor 20.

Figure 13:
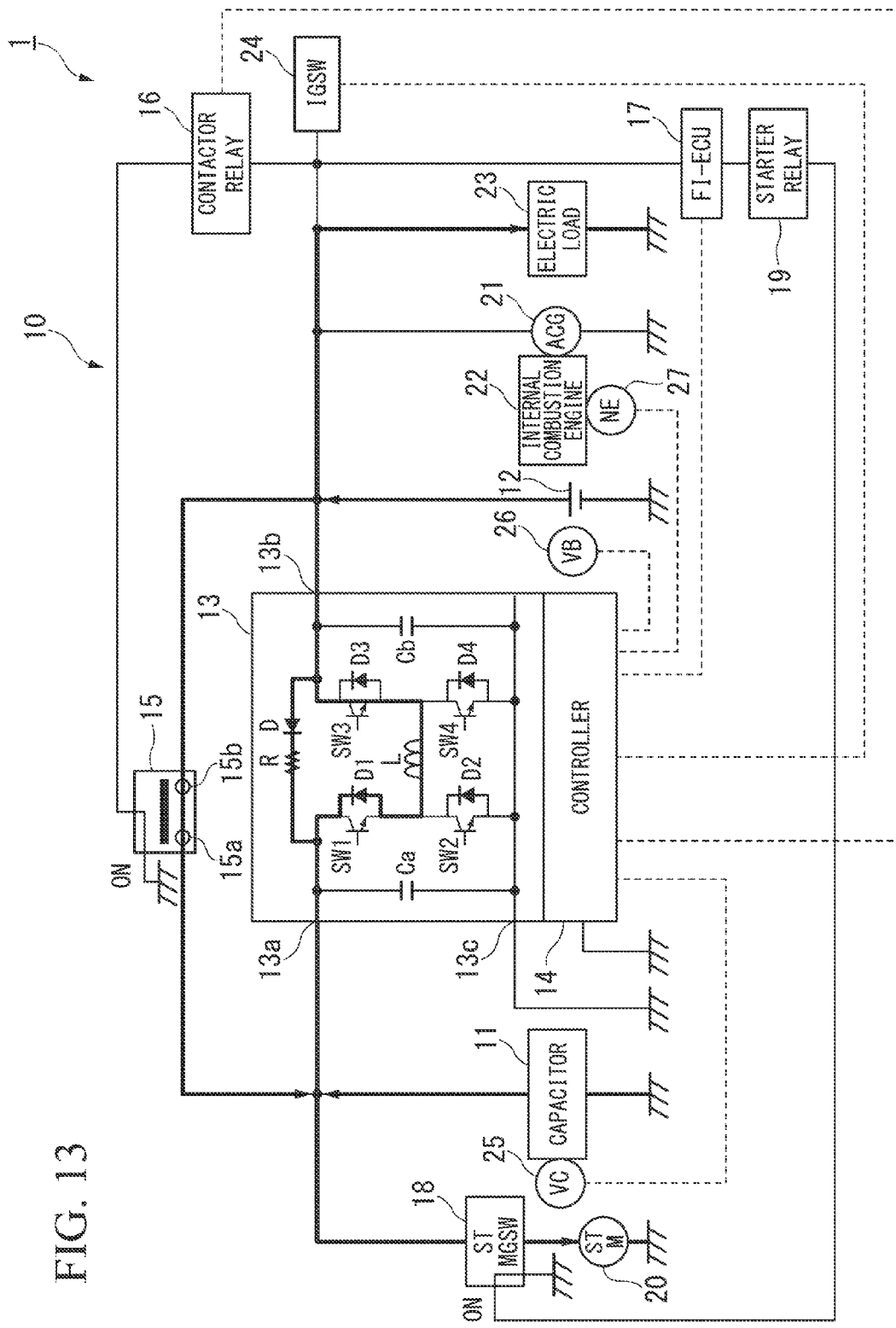
FIG. 13 is a diagram showing a current flow when a contactor is set to a connecting state in the ENG restarting mode performed by the controller of the vehicle electric power supply apparatus according to the embodiment of the present invention.

Note that, for example, as time t8 shown in FIG. 2, in the case that it is impossible to restart the internal combustion engine 22 by electric power supply from only the capacitor 11 to the starter motor 20 when the operation of the ENG restarting mode M7 is performed, as shown in FIG. 13, the controller 14 sets the contactor 15 to be in a connecting state by setting the contactor relay 16 to ON. Thereby, the controller 14 drives the starter motor 20 by electric power supply from the capacitor 11 and the battery 12 and restarts the internal combustion engine 22 by the driving force of the starter motor 20.

The controller 14 determines that it is impossible to restart the internal combustion engine 22 in the case that the rotation frequency of the internal combustion engine 22 (engine rotation frequency NE) detected by the rotation frequency sensor 27 is a predetermined rotation frequency or less after a predetermined length of time elapses since the beginning of restarting the internal combustion engine 22, in the case that a signal indicating a starting error of the internal combustion engine 22 output from the FI-ECU 17 is received, or the like.

The controller 14 inhibits the next execution of idle stopping in the case that the internal combustion engine 22 is restarted by setting the contactor relay 16 to ON. Note that, the determination basis of inhibition of the next execution of idle stopping is not limited only to whether or not the internal combustion engine 22 is restarted by setting the contactor relay 16 to ON. The controller 14 may calculate the total number of times of the restarting and inhibit the next execution of idle stopping in the case that the total number of times is a predetermined number of times or more (for example, once or more). In addition, the controller 14 may inhibit the next execution of idle stopping in the case that the output voltage of the battery 12 decreases to a predetermined lower-limit voltage or less when the internal combustion engine 22 is restarted by setting the contactor relay 16 to ON.

Next, for example, as the period of time t8 to time t9 shown in FIG. 2, in a state where the vehicle 1 is in a running state other than deceleration and where there is no execution command of idle stopping, the controller 14 performs the operation of the I/S preparation charging mode M2 described above.

Figure 14:
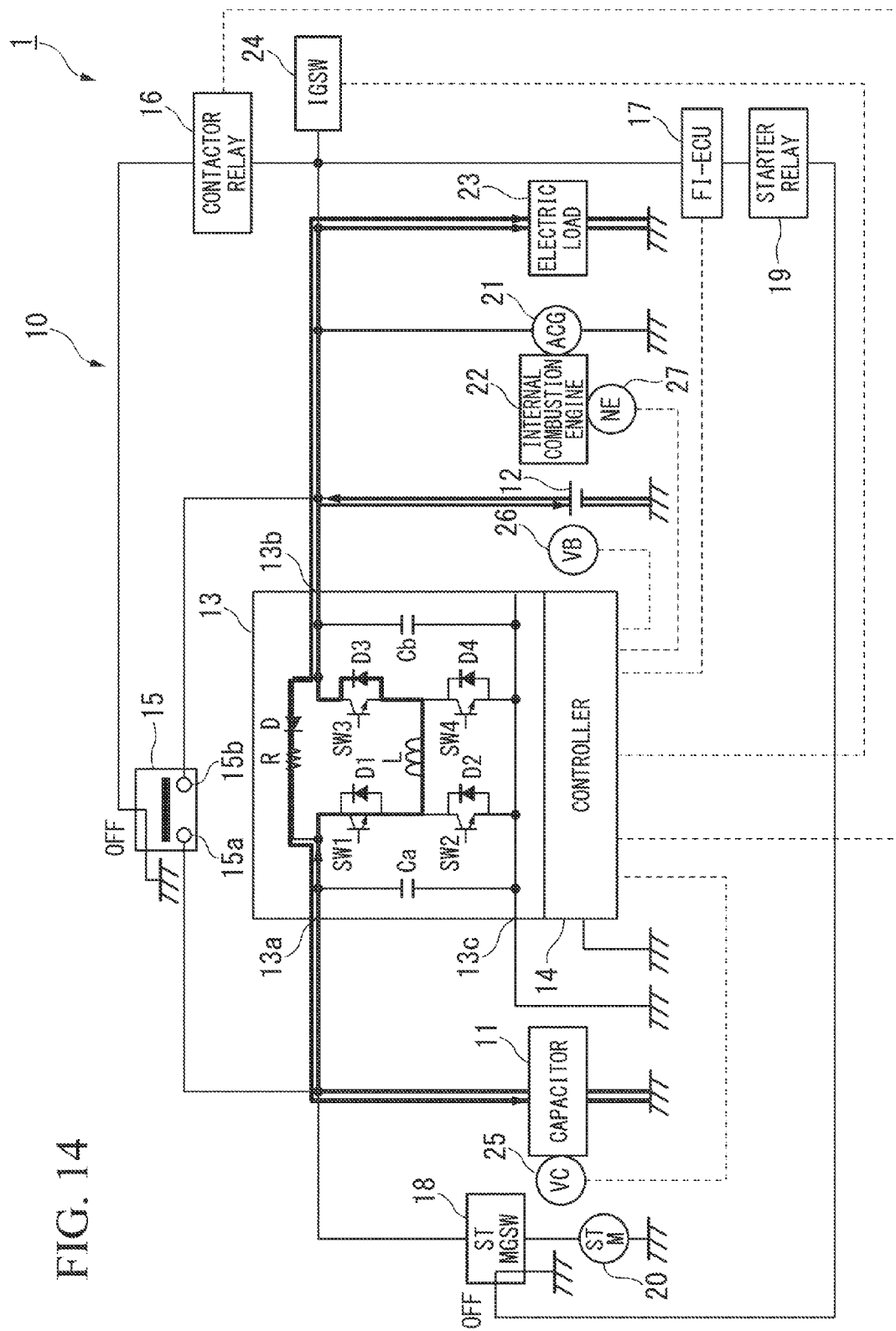
FIG. 14 is a diagram showing a current flow in a vehicle stopping-period mode performed by the controller of the vehicle electric power supply apparatus according to the embodiment of the present invention.

Next, the controller 14 performs the operation of a vehicle stopping-period mode M8 over a predetermined length of time since the ignition switch 24 is switched from ON to OFF. In the vehicle stopping-period mode M8, as shown in FIG. 14, the controller 14 sets the contactor 15 to be in a disconnecting state by setting the contactor relay 16 to OFF and sets the starter magnet switch 18 to be in a disconnecting state by setting the starter relay 19 to OFF. The controller 14 discharges the capacitor 11 by electric power supply from the capacitor 11 to the battery 12 and the electric load 23 via the DC-DC converter 13 and suppresses degradation of the capacitor 11 in the stopping period of the vehicle 1. In more detail, the controller 14 applies a current to the first switching device SW1 in an ON state, the reactor L, and the third diode D3 in between the first input-output terminal 13a and the second input-output terminal 13b of the DC-DC converter 13.

Note that, in order to prevent the output voltage of the capacitor 11 in the stopping period of the vehicle 1 from decreasing to less than the predetermined minimum safeguard voltage, the controller 14 charges the capacitor 11 by electric power supply from the battery 12 to the capacitor 11 via the diode D and the resistance R of the DC-DC converter 13 in addition to electric power supply from the battery 12 to the electric load 23.

In the case that the ignition switch 24 is turned off and the vehicle 1 becomes in a stopping state, the controller 14 removes inhibition of the next execution of idle stopping that requires restarting of the internal combustion engine 22 by the driving of the starter motor 20 (namely, driving inhibition of the starter motor 20).

(Contactor Control)

Hereinafter, control of connection and disconnection of the contactor 15 by the contactor relay 16 will be described in detail.

(Contactor Control, Failure Detection)

In the starting of the vehicle 1 when the ignition switch 24 is switched from OFF to ON, before the starting of the internal combustion engine 22, the controller 14 performs failure detection of the contactor 15 by using the output voltage VC of the capacitor 11 detected by the first voltage sensor 25 and the output voltage VB of the battery 12 detected by the second voltage sensor 26.

Figure 15:
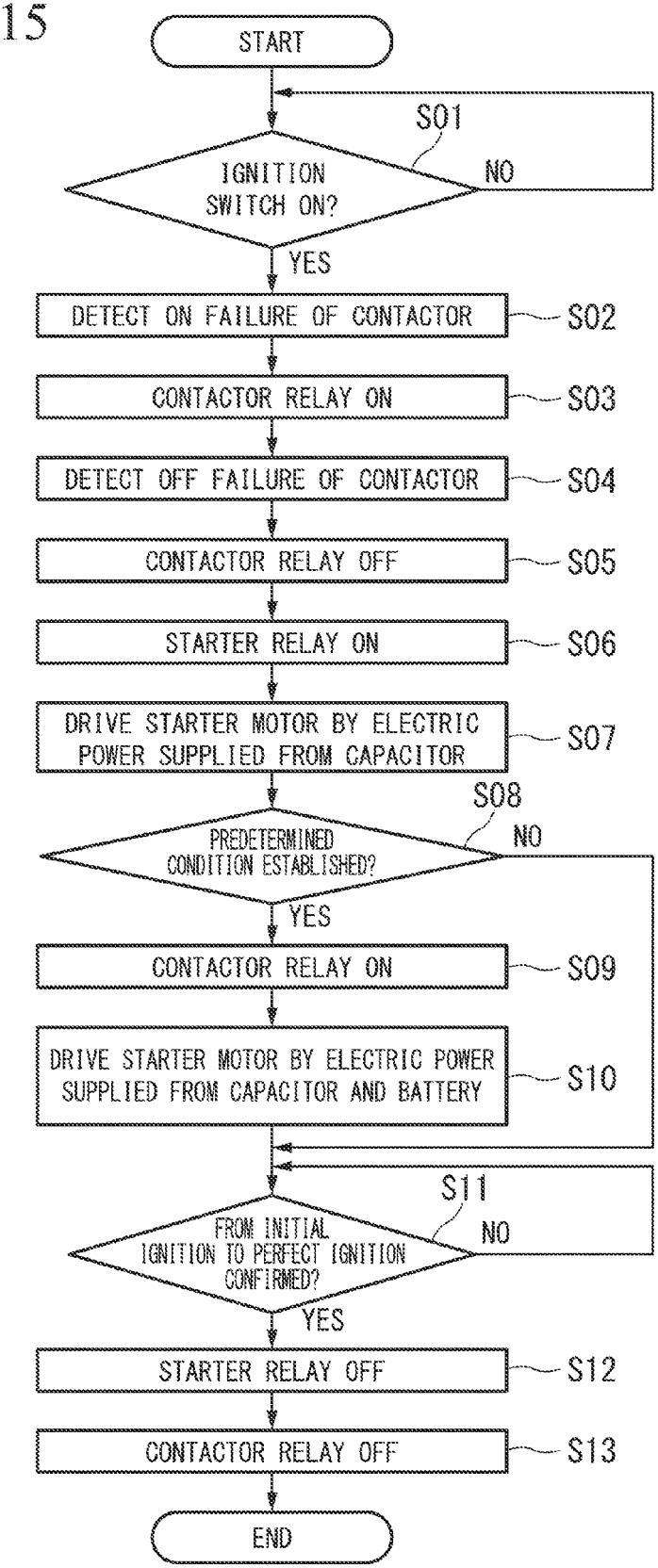
FIG. 15 is a flowchart showing a process of a contactor control in failure detection and first-time start-up performed by the controller of the vehicle electric power supply apparatus according to the embodiment of the present invention.

First, for example, in step S01 shown in FIG. 15, the controller 14 determines whether or not the ignition switch 24 is switched from OFF to ON.

In the case that this determination result is "No", the determination process of step S01 is repeatedly performed.

On the other hand, in the case that this determination result is "Yes", the routine proceeds to step S02.

Next, in step S02, the controller 14 detects the presence or absence of the ON failure of the contactor 15. In more detail, the controller 14 determines whether or not the absolute value of the difference between the output voltage VC and the output voltage VB is a predetermined first threshold value or less over a predetermined length of time in a state where it is commanded to set the contactor 15 to be in a disconnecting state by setting the contactor relay 16 to OFF.

In the case that this determination result is "No", it is determined that the contactor 15 is normal.

On the other hand, in the case that this determination result is "Yes", it is determined that the output voltage VC of the capacitor 11 and the output voltage VB of the battery 12 are substantially the same (the difference between the output voltage VC and the output voltage VB is within a range of error) due to the occurrence of the ON failure in which the contactor 15 is fixed to be in a connecting state.

Note that, the predetermined first threshold value is appropriately set according to the accuracy of the measurement device (first voltage sensor 25, second voltage sensor 26), the accuracy of the whole measurement system, measurement environments, or the like.

For example, the first threshold value can be 0.001VC, 0.002VC, 0.003VC, 0.004VC, 0.005VC, 0.006VC, 0.007VC, 0.008VC, 0.009VC, 0.01VC, 0.02VC, 0.03VC, 0.04VC, 0.05VC, 0.06VC, 0.07VC, 0.08VC, 0.09VC, or 0.1VC.

Alternatively, the first threshold value can be 0.001VB, 0.002VB, 0.003VB, 0.004VB, 0.005VB, 0.006VB, 0.007VB, 0.008VB, 0.009VB, 0.01VB, 0.02VB, 0.03VB, 0.04VB, 0.05VB, 0.06VB, 0.07VB, 0.08VB, 0.09VB, or 0.1VB.

In the case that the controller 14 determines that an ON failure of the contactor 15 occurs, the controller 14 notifies of the ON failure by a notification device (not shown in the drawing) that performs notification by display or sound output and inhibits execution of idle stopping.

Next, in step S03, the controller 14 commands setting the contactor 15 to be in a connecting state by setting the contactor relay 16 to ON.

Next, in step S04, the controller 14 detects the presence or absence of an OFF failure of the contactor 15. In more detail, the controller 14 determines whether or not the output voltage VC and the output voltage VB change between before and after the controller 14 commands setting the contactor 15 to be in a connecting state.

In the case that this determination result is "Yes", it is determined that the contactor 15 is normal.

On the other hand, in the case that this determination result is "No", it is determined that the OFF failure in which the contactor 15 is fixed to be in a disconnecting state occurs.

Figure 16:
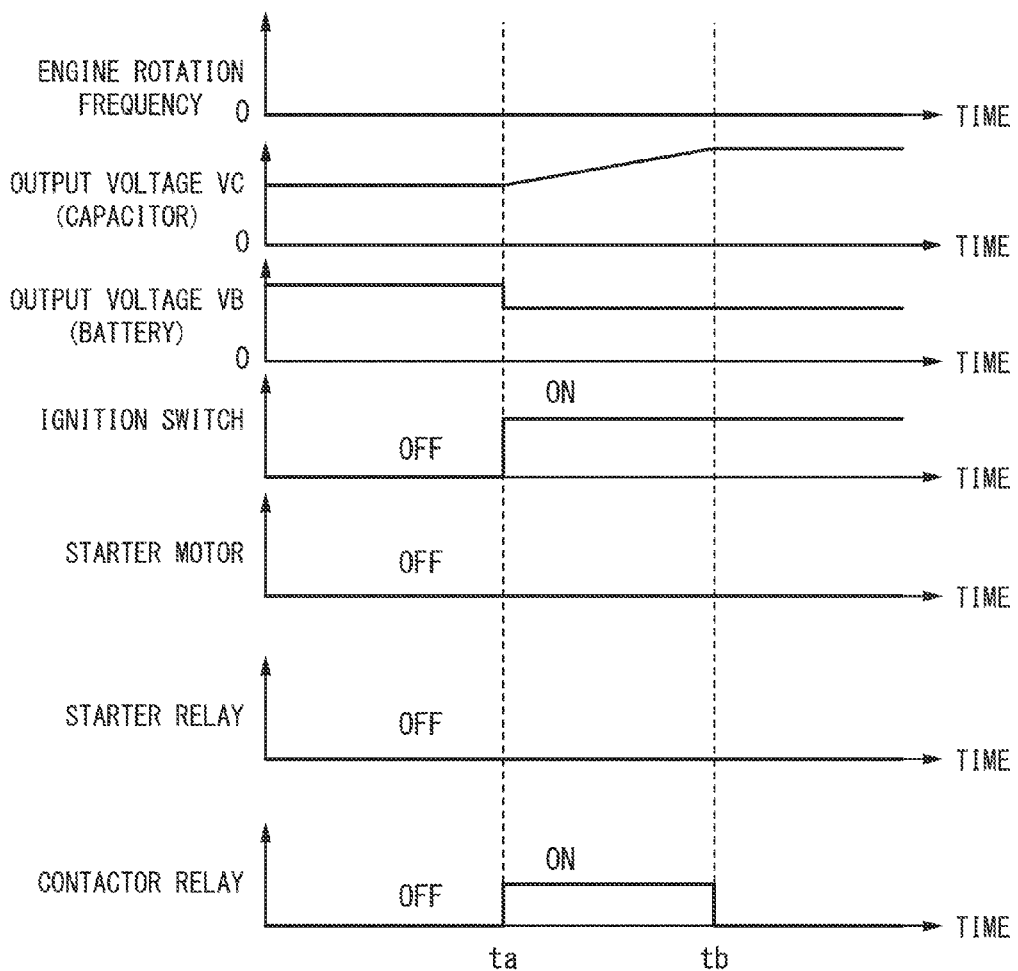
FIG. 16 is a diagram showing an engine rotation frequency, an output voltage of a capacitor, an output voltage of a battery, an on/off state of an ignition switch, a driving state of a starter motor, an on/off state of a starter relay, and an on/off state of a contactor relay in the case that the presence or absence of an OFF failure of the contactor is detected before the starting of the internal combustion engine in the starting of the vehicle when the ignition switch is switched from OFF to ON in the vehicle electric power supply apparatus according to the embodiment of the present invention.

For example, as before time ta shown in FIG. 16, in the stopping state of the vehicle 1, normally, the controller 14 sets the output voltage of the capacitor 11 to equal to or less than a predetermined voltage which is lower than the output voltage of the battery 12 in order to suppress degradation of the capacitor 11. In this state, as the period of time ta to time tb, when electric power supply from the battery 12 to the capacitor 11 is started by setting the contactor relay 16 to ON, and the output voltage VB of the battery 12 decreases and the output voltage VC of the capacitor 11 increases, the controller 14 determines that the contactor 15 is normal.

In the case that the controller 14 determines that an OFF failure of the contactor 15 occurs, the controller 14 notifies the driver of the vehicle 1 of the occurrence of an OFF failure by the notification device (not shown in the drawing) and inhibits execution of idle stopping. Moreover, the controller 14 sets driving of the starter motor 20 to be waiting until the temperature of the capacitor 11 increases to a predetermined temperature or more in order to enable the internal combustion engine 22 to start by electric power supply from only the capacitor 11 at the first-time start-up. Then, the controller 14 notifies the driver of the vehicle 1, by the notification device (not shown in the drawing), of that the internal combustion engine 22 is set to be waiting for starting.

Next, in step S05, in the case that the contactor relay 16 is set to ON, the controller 14 sets the contactor 15 to be in a disconnecting state by switching the contactor relay 16 from ON to OFF.

(Contactor Control, First-Time Start-Up)

Next, the controller 14 performs failure detection of the contactor 15 and then performs the operation of the first-time start-up mode M1.

First, in step S06 shown in FIG. 15, the controller 14 sets the starter magnet switch 18 to be in a connecting state by setting the starter relay 19 to ON. Then, the pinion gear of the starter motor 20 is engaged with the ring gear of the internal combustion engine 22, and a state in which the driving force of the starter motor 20 is capable of being transmitted to the internal combustion engine 22 is set.

Next, in step S07, the controller 14 drives the starter motor 20 by electric power supply from only the capacitor 11.

Next, in step S08, the controller 14 determines whether or not a predetermined condition is established. The predetermined condition is, for example, that the output voltage VC of the capacitor 11 and the output voltage VB of the battery 12 are a predetermined first voltage or more, the output voltage VC of the capacitor 11 is a predetermined second voltage or less, and the rotation frequency of the internal combustion engine 22 (engine rotation frequency NE) detected by the rotation frequency sensor 27 is a predetermined rotation frequency (second threshold value) or less. The predetermined first voltage is a voltage required to prevent welding and wear of the contactor 15. The predetermined second voltage is a voltage that is allowed to be applied to the battery 12 during electric power supply from the capacitor 11 to the battery 12.

In the case that this determination result is "No", the routine proceeds to step S11 described later.

On the other hand, in the case that this determination result is "Yes", the routine proceeds to step S09.

Next, in step S09, the controller 14 sets the contactor 15 to be in a connecting state by setting the contactor relay 16 to ON.

Next, in step S10, the controller 14 drives the starter motor 20 by electric power supplied from the capacitor 11 and the battery 12 and starts the internal combustion engine 22.

Next, in step S11, the controller 14 determines whether or not the states of the internal combustion engine 22 from initial ignition to perfect ignition are confirmed.

In the case that this determination result is "No", the determination process of step S11 is repeatedly performed.

On the other hand, in the case that this determination result is "Yes", the routine proceeds to step S12.

Note that, the controller 14 determines that perfect ignition occurs in the case that the engine rotation frequency NE detected by the rotation frequency sensor 27 reaches a predetermined determination rotation frequency used to determine perfect ignition of the internal combustion engine 22.

Next, in step S12, the controller 14 sets the starter magnet switch 18 to be in a disconnecting state by setting the starter relay 19 to OFF and stops the driving of the starter motor 20. Then, the engagement between the pinion gear of the starter motor 20 and the ring gear of the internal combustion engine 22 is removed, and power transmission between the starter motor 20 and the internal combustion engine 22 is disconnected.

Next, in step S13, in the case that the contactor relay 16 is set to ON, the controller 14 sets the contactor 15 to be in a disconnecting state by switching the contactor relay 16 from ON to OFF and completes starting of the internal combustion engine 22, and the routine proceeds to END.

(Contactor Control, ENG Restarting)

The controller 14 performs the operation of the ENG restarting mode M∂in an idle stopping state of the vehicle 1.

Figure 17:
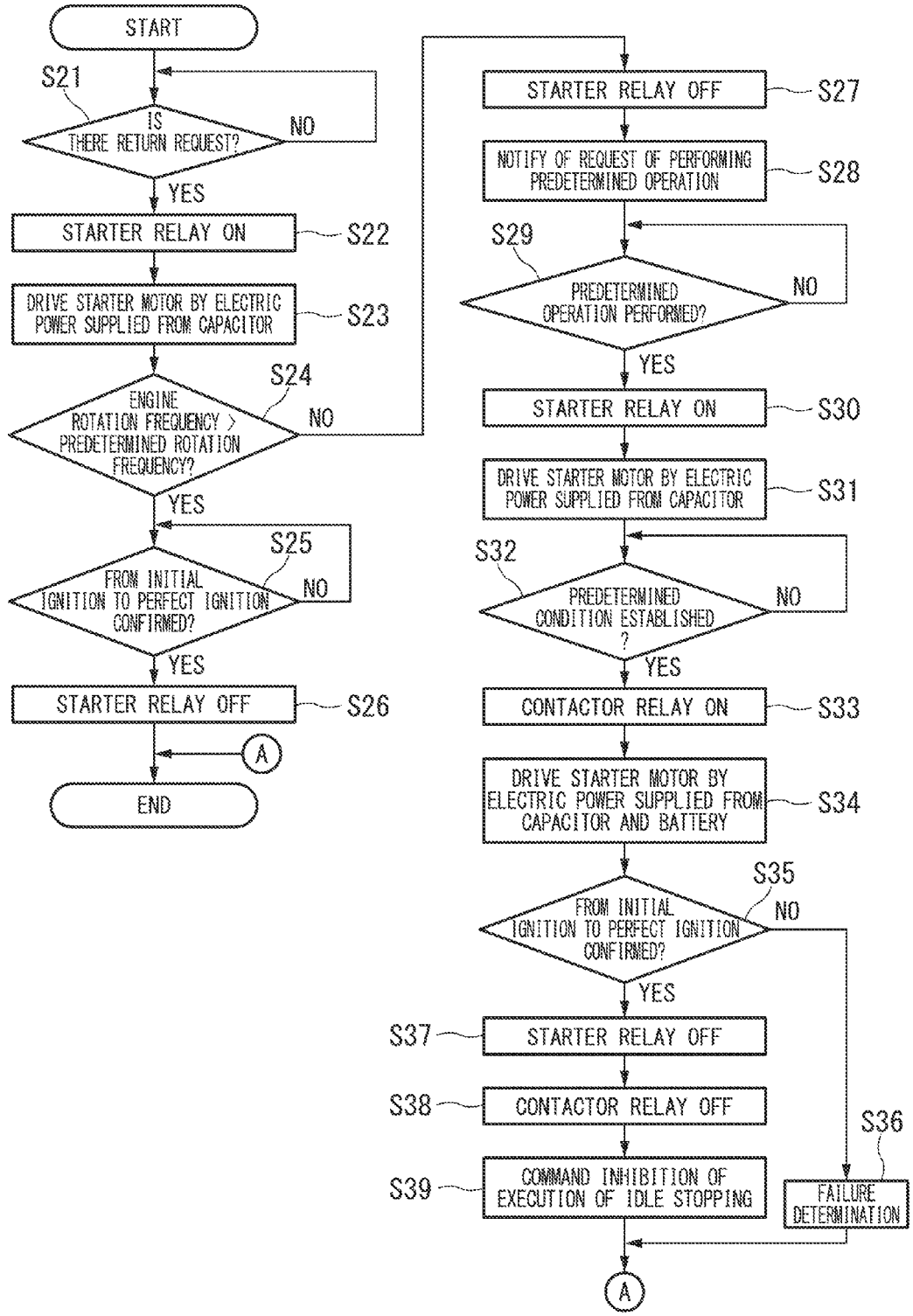
FIG. 17 is a flowchart showing a process of a contactor control in ENG restarting performed by the controller of the vehicle electric power supply apparatus according to the embodiment of the present invention.

First, in step S21 shown in FIG. 17, the controller 14 determines whether or not a return request that requests to restart the internal combustion engine 22 in a pause state due to idle stopping is received.

In the case that this determination result is "No", the determination process of step S21 is repeatedly performed.

On the other hand, in the case that this determination result is "Yes", the routine proceeds to step S22.

Note that, the return request is, for example, output from the FI-ECU 17 in the case that the brake pedal operation by the driver is removed or the like.

Next, in step S22, the controller 14 sets the starter magnet switch 18 to be in a connecting state by setting the starter relay 19 to ON. Then, the pinion gear of the starter motor 20 is engaged with the ring gear of the internal combustion engine 22, and a state in which the driving force of the starter motor 20 is capable of being transmitted to the internal combustion engine 22 is set.

Next, in step S23, the controller 14 drives the starter motor 20 by electric power supply from only the capacitor 11.

Next, in step S24, the controller 14 determines whether or not the output voltage VC of the capacitor 11 is a predetermined third voltage or more and the engine rotation frequency NE detected by the rotation frequency sensor 27 is greater than a predetermined rotation frequency after a predetermined length of time elapses since the beginning of restarting the internal combustion engine 22. Note that, the predetermined third voltage is a voltage required for a current that flows through the contactor 15 to be a predetermined upper-limit current or less in the case that the contactor 15 in a disconnecting state at this time is switched to a connecting state.

In the case that this determination result is "No", it is determined that the situation is a starting limit, and the routine proceeds to step S27 described later.

On the other hand, in the case that this determination result is "Yes", the routine proceeds to step S25.

Next, in step S25, the controller 14 determines whether or not the states of the internal combustion engine 22 from initial ignition to perfect ignition are confirmed.

In the case that this determination result is "No", the determination process of step S25 is repeatedly performed.

On the other hand, in the case that this determination result is "Yes", the routine proceeds to step S26.

Then, in step S26, the controller 14 sets the starter magnet switch 18 to be in a disconnecting state by setting the starter relay 19 to OFF and stops the driving of the starter motor 20. Then, the engagement between the pinion gear of the starter motor 20 and the ring gear of the internal combustion engine 22 is removed, and power transmission between the starter motor 20 and the internal combustion engine 22 is disconnected. Thereby, the controller 14 completes starting of the internal combustion engine 22, and the routine proceeds to END.

In addition, in step S27, the controller 14 sets the starter magnet switch 18 to be in a disconnecting state by setting the starter relay 19 to OFF and stops driving of the starter motor 20. Then, the engagement between the pinion gear of the starter motor 20 and the ring gear of the internal combustion engine 22 is removed, and power transmission between the starter motor 20 and the internal combustion engine 22 is disconnected.

Thereby, the controller 14 stops the internal combustion engine 22.

Next, in step S28, the controller 14 notifies the driver of the vehicle 1, by the notification device (not shown in the drawing), of that it is necessary to perform a predetermined operation (for example, a predetermined key operation, an ON operation of the ignition switch 24, or the like) in order to restart the internal combustion engine 22.

Next, in step S29, the controller 14 determines whether or not the predetermined operation is performed by the driver of the vehicle 1.

In the case that this determination result is "No", the determination process of step S29 is repeatedly performed.

On the other hand, in the case that this determination result is "Yes", the routine proceeds to step S30.

Then, in step S30, the controller 14 starts performing the operation similar to the first-time start-up mode M1. In more detail, first, the starter magnet switch 18 is set to be in a connecting state by setting the starter relay 19 to ON. Then, the pinion gear of the starter motor 20 is engaged with the ring gear of the internal combustion engine 22, and a state in which the driving force of the starter motor 20 is capable of being transmitted to the internal combustion engine 22 is set.

Next, in step S31, the controller 14 drives the starter motor 20 by electric power supply from only the capacitor 11.

Next, in step S32, the controller 14 determines whether or not the predetermined condition described above is established.

In the case that this determination result is "No", the determination process of step S32 is repeatedly performed.

On the other hand, in the case that this determination result is "Yes", the routine proceeds to step S33.

Next, in step S33, the controller 14 sets the contactor 15 to be in a connecting state by setting the contactor relay 16 to ON.

Next, in step S34, the controller 14 drives the starter motor 20 by electric power supplied from the capacitor 11 and the battery 12 and restarts the internal combustion engine 22.

Next, in step S35, the controller 14 determines whether or not the states of the internal combustion engine 22 from initial ignition to perfect ignition are confirmed.

In the case that this determination result is "No", the routine proceeds to step S36. In this step S36, it is determined that an abnormality of the internal combustion engine 22 occurs, and the routine proceeds to END.

On the other hand, in the case that this determination result is "Yes", the routine proceeds to step S37.

Then, in step S37, the controller 14 sets the starter magnet switch 18 to be in a disconnecting state by setting the starter relay 19 to OFF and stops the driving of the starter motor 20. Then, the engagement between the pinion gear of the starter motor 20 and the ring gear of the internal combustion engine 22 is removed, and power transmission between the starter motor 20 and the internal combustion engine 22 is disconnected.

Next, in step S38, the controller 14 sets the contactor 15 to be in a disconnecting state by setting the contactor relay 16 to OFF and completes restarting of the internal combustion engine 22.

Then, in step S39, the controller 14 commands inhibition of the next execution of idle stopping, and the routine proceeds to END.

For example, in the case that the engine rotation frequency NE is a predetermined lower-limit rotation frequency or less within a predetermined period of time elapsed since the completion of restarting of the internal combustion engine 22, the controller 14 determines that an abnormality of the electric power supply circuit configured by the capacitor 11 and the battery 12 occurs and inhibits the next execution of idle stopping.

In addition, for example, in the case that the engine rotation frequency NE is a predetermined lower-limit rotation frequency or less within a predetermined period of time elapsed since the completion of restarting of the internal combustion engine 22, the controller 14 changes (for example, increases) the predetermined I/S lower-limit voltage. In the case that the output voltage VC of the capacitor 11 detected by the first voltage sensor 25 is less than the I/S lower-limit voltage after the change, the controller 14 inhibits execution of idle stopping.

As described above, according to the vehicle electric power supply apparatus 10 of the present embodiment, during the starting of the vehicle 1 when the ignition switch 24 is switched from OFF to ON, before the starting of the internal combustion engine 22, the controller 14 detects the presence or absence of an OFF failure of the contactor 15. At this time, the controller 14 commands that the contactor 15 is set to be in a connecting state by setting the contactor relay 16 to ON, and therefore, in the case that the contactor 15 is normal, it is possible to clean up the contact point of the contactor 15. Moreover, it is possible to increase the output voltage of the capacitor 11 by electric power supplied from the battery 12 to the capacitor 11, and it is possible to improve the starting performance and the toughness performance when the internal combustion engine 22 is started by electric power supplied from the capacitor 11 to the starter motor 20. In addition, in the case that an OFF failure occurs, the controller 14 sets driving of the starter motor 20 to be waiting until the temperature of the capacitor 11 increases to a predetermined temperature or more at the first-time start-up, and therefore it is possible to start the internal combustion engine 22 adequately by electric power supplied from the capacitor 11 to the starter motor 20.

Moreover, since the controller 14 detects the presence or absence of an ON failure of the contactor 15 and, in the case that an ON failure occurs, inhibits execution of idle stopping, namely inhibits driving of the starter motor 20, it is possible to prevent the output voltage of the battery 12 from decreasing and to prevent electric power supply shortage in the electric load 23 as a variety of auxiliary machines to which electric power is supplied from the battery 12 from occurring.

In addition, as described above, according to the vehicle electric power supply apparatus 10 of the present embodiment, because the controller 14 first drives the starter motor 20 by electric power supplied from only the capacitor 11 when the operation of the first-time start-up mode is performed, it is possible to prevent the output voltage of the battery 12 from decreasing and to prevent electric power supply shortage in the electric load 23 as a variety of auxiliary machines to which electric power is supplied from the battery 12 from occurring. For example, by preventing the controller 14 to which electric power is supplied from the battery 12 from being reset, it is possible to prevent the starting time when the internal combustion engine 22 is started from being long and to improve the starting performance and the toughness performance.

Moreover, because the controller 14 connects the contactor 15 in the case that a predetermined condition is established in a state where the starter motor 20 is driven by electric power supplied from only the capacitor 11, it is possible to prevent the contactor 15 from being unnecessarily connected. Moreover, because the contactor 15 is connected in the case that electric power supplied from the capacitor 11 to the starter motor 20 is actually insufficient, it becomes possible to supply electric power from the battery 12 to the starter motor 20, and it is possible to appropriately start the internal combustion engine 22.

Moreover, in the case that the controller 14 stops driving of the starter motor 20, because the controller 14 disconnects the starter magnet switch 18 by setting the starter relay 19 to OFF and then disconnects the contactor 15 by setting the contactor relay 16 to OFF, it is possible to suppress contact point wearing of the contactor 15.

Moreover, in the case that it is impossible to restart the internal combustion engine 22 by electric power supply from only the capacitor 11 to the starter motor 20 when the operation of the ENG restarting mode is performed, the controller 14 stops the starter motor 20 and the internal combustion engine 22 and then connects the contactor 15. Thereby, the controller 14 can prevent the output voltage of the battery 12 from decreasing by supplying electric power from the battery 12 to the capacitor 11 during the driving of the vehicle 1.

Moreover, the controller 14 inhibits execution of the idle stopping in a state where restarting of the internal combustion engine 22 from the idle stopping is not allowed, namely in a state where it is necessary to connect the contactor 15 in order to restart the internal combustion engine 22 and therefore there is a possibility that the output voltage of the battery 12 decreases. Thereby it is possible to appropriately keep the vehicle 1 being capable of being driven.

Note that, the technical scope of the present invention is not limited to the above-described embodiments and a variety of modifications can be made to the above-described embodiments without departing from the scope of the present invention. Accordingly, it should be understood that the configurations in the embodiments described and illustrated above are exemplary of the invention and can be suitably altered.

For example, in the embodiment described above, the DC-DC converter 13 is an H-bridge step-up/step-down DC-DC converter, but the converter is not limited thereto. The converter may be a step-up/step-down DC-DC converter having another configuration.

For example, in the embodiment described above, the contactor 15 may be another switch.

For example, in the embodiment described above, in the case that a predetermined condition is established when the operation of the first-time start-up mode M1 is performed, the controller 14 sets the contactor 15 to be in a connecting state and drives the starter motor 20 by electric power supplied from the capacitor 11 and the battery 12. However, the present invention is not limited thereto. In the case that the remaining capacity SOC of the capacitor 11 is insufficient, the controller 14 may inhibit driving of the starter motor 20 and also charge the capacitor 11 by electric power supplied from the battery 12 to the capacitor 11 until the output voltage of the capacitor 11 reaches a voltage which is capable of starting the internal combustion engine 22.

What is claimed is:
1. A vehicle electric power supply apparatus mounted in a vehicle provided with an internal combustion engine and with an idle stopping unit that is used to execute idle stopping in which the internal combustion engine is temporarily stopped, the apparatus comprising:
 a first power source;
 a second power source that is connected in parallel to the first power source;
 a DC-DC converter that is connected between the first power source and the second power source;
 a switch that is connected in parallel to the DC-DC converter and is connected between the first power source and the second power source;

an opening and closing unit that is used to open and close the switch;

a control unit that controls the DC-DC converter and the opening and closing unit;

an electric motor that is connected to the second power source and is used to start the internal combustion engine;

and a rotation frequency detection unit that is used to detect a rotation frequency of the internal combustion engine, wherein the control unit controls the opening and closing unit to set the switch to an OFF state to drive the electric motor via electric power supplied from the second power source, and wherein the control unit controls the opening and closing unit to set the switch to an ON state, to supply electric power from the first power source to the electric motor, and controls the idle stopping unit to inhibit next execution of the idle stopping when the rotation frequency detected by the rotation frequency detection unit after a predetermined length of time elapses in the starting of the internal combustion engine by the electric motor is a predetermined threshold value or less, whereby inhibiting next execution of the idle stopping prevents further electric power consumption of the first power source when the rotation frequency is the predetermined threshold value or less.

* * * * *